United States Patent
Chung et al.

(10) Patent No.: US 11,074,428 B2
(45) Date of Patent: Jul. 27, 2021

(54) FINGERPRINT IDENTIFICATION DEVICE AND METHOD

(71) Applicant: Novatek Microelectronics Corp., Hsinchu (TW)

(72) Inventors: Hsing-Lung Chung, Miaoli County (TW); Chien-Chung Liu, Hsinchu (TW); Jou-Chia Chen, Yunlin County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/261,579

(22) Filed: Jan. 30, 2019

(65) Prior Publication Data

US 2020/0242328 A1 Jul. 30, 2020

(51) Int. Cl.
*G06K 9/00* (2006.01)
*G06F 3/041* (2006.01)

(52) U.S. Cl.
CPC ....... *G06K 9/00087* (2013.01); *G06F 3/0416* (2013.01); *G06K 9/00993* (2013.01)

(58) Field of Classification Search
None
See application file for complete search history.

(56) References Cited

U.S. PATENT DOCUMENTS

| | | | | |
|---|---|---|---|---|
| 2006/0067566 A1* | 3/2006 | Hara | ........... | G06K 9/00067 382/124 |
| 2015/0186706 A1* | 7/2015 | Pierce | ........... | G06K 9/00067 382/124 |
| 2017/0262691 A1* | 9/2017 | Kuda | ........... | G06K 9/0008 |
| 2018/0007192 A1* | 1/2018 | Tanabe | ........... | H04M 1/72569 |
| 2018/0218195 A1 | 8/2018 | Sheik-Nainar et al. | | |
| 2019/0318073 A1* | 10/2019 | Lee | ........... | G06F 21/32 |
| 2020/0022085 A1* | 1/2020 | Zhang | ........... | G06K 9/00013 |

* cited by examiner

*Primary Examiner* — Joseph R Haley
(74) *Attorney, Agent, or Firm* — JCIPRNET

(57) ABSTRACT

A fingerprint identification device and method are provided. The fingerprint identification device includes a touch-sensing panel, a fingerprint sensor, and a processing circuit. The fingerprint sensing area of the fingerprint sensor is located in the touch-sensing area of the touch-sensing panel. The processing circuit senses the touch area of an object in the touch-sensing area via the touch-sensing panel when the object contacts the touch-sensing area of the touch-sensing panel. The processing circuit senses the fingerprint of the object via the fingerprint sensor to obtain a fingerprint template. The processing circuit determines the finger attribute of the object based on the physical characteristics of the touch area. The processing circuit selects the registered template related to the finger attribute from a plurality of registered templates according to the finger attribute, so as to perform fingerprint matching on the fingerprint template.

26 Claims, 19 Drawing Sheets

FINGERPRINT IDENTIFICATION DEVICE AND METHOD

BACKGROUND

Field of the Invention

The invention relates to an electronic device and more particularly, to a device and a method for fingerprint identification.

Description of Related Art

Generally, a fingerprint identification device compares (performs fingerprint matching on) a fingerprint of an object which is sensed by a fingerprint sensor with at least one registered fingerprint. In a condition that the number of the at least one registered fingerprint is plural, a conventional fingerprint matching method is performed in a manner that one of the registered fingerprints is selected according an order of the registered fingerprints in a database. For example, a processing circuit of the fingerprint identification device may select a first one of the registered fingerprints from the database, so as to perform the fingerprint matching operation once on the fingerprint of the object. When a fingerprint matching result related to the first registered fingerprint is failed (unmatched), the processing circuit may select a second one of the registered fingerprints, so as to perform another fingerprint matching operation on the fingerprint of the object and so on, until the fingerprint matching result of the fingerprint of the object is successful (matched). The order of these registered fingerprints in the database is fixed. Imaginably, as the number of the registered fingerprints in the database increases, the time spent for performing the fingerprint matching operation in the conventional fingerprint matching method becomes longer.

It should be noted that the content of the section of "Description of Related Art" is used for facilitating the understanding of the invention. A part of the content (or all content) disclosed in the section of "Description of Related Art" may not pertain to the conventional technique known to the persons with ordinary skilled in the art. The content disclosed in the section of "Description of Related Art" does not represent that the content has been known to the persons with ordinary skilled in the art prior to the filing of this invention application.

SUMMARY

The invention provides a fingerprint identification device and method capable of enhancing an efficiency for fingerprint matching.

According to an embodiment of the invention, a fingerprint identification device is provided. The fingerprint identification device includes a touch-sensing panel, a fingerprint sensor and a processing circuit. The fingerprint sensor is disposed under the touch-sensing panel, wherein a fingerprint sensing area of the fingerprint sensor is located in a touch-sensing area of the touch-sensing panel. The processing circuit is coupled to the touch-sensing panel and the fingerprint sensor. When an object contacts the touch-sensing area of the touch-sensing panel, the processing circuit senses a first touch area of the object in the touch-sensing area via the touch-sensing panel. The processing circuit senses a fingerprint of the object via the fingerprint sensor to obtain a first fingerprint template. The processing circuit determines a finger attribute of the object according to a first physical characteristic of the first touch area. The processing circuit selects at least one registered template related of the finger attribute from a plurality of registered templates according to the finger attribute, so as to perform fingerprint matching on the first fingerprint template.

According to an embodiment of the invention, a fingerprint identification method is provided. The fingerprint identification method includes the following steps. When an object contacts a touch-sensing area of a touch-sensing panel, a first touch area of the object in the touch-sensing area is sensed via the touch-sensing panel, wherein a fingerprint sensor is disposed under the touch-sensing panel, and a fingerprint sensing area of the fingerprint sensor is located in the touch-sensing area of the touch-sensing panel. A fingerprint of the object is sensed via the fingerprint sensor to obtain a first fingerprint template. A finger attribute of the object is determined according to a first physical characteristic of the first touch area. At least one registered template related of the finger attribute is selected from a plurality of registered templates according to the finger attribute, so as to perform fingerprint matching on the first fingerprint template.

According to an embodiment of the invention, a fingerprint identification device is provided. The fingerprint identification device includes a touch-sensing panel, a fingerprint sensor and a processing circuit. The fingerprint sensor is disposed under the touch-sensing panel, wherein a fingerprint sensing area of the fingerprint sensor is located in a touch-sensing area of the touch-sensing panel. The processing circuit is coupled to the touch-sensing panel and the fingerprint sensor. In a registration mode, the processing circuit senses a fingerprint of a finger via the fingerprint sensor to obtain a fingerprint template. The processing circuit detects a physical characteristic of a touch area of the finger in the touch-sensing area via the touch-sensing panel. The processing circuit serves the fingerprint template and the physical characteristic as a newly added registered template.

According to an embodiment of the invention, a fingerprint identification method is provided. The fingerprint identification method includes the following steps. A fingerprint sensor is disposed under a touch-sensing panel, wherein a fingerprint sensing area of the fingerprint sensor is located in a touch-sensing area of the touch-sensing panel. In a registration mode, a fingerprint of a finger is sensed via the fingerprint sensor to obtain a fingerprint template. A physical characteristic of a touch area of the finger in the touch-sensing area is detected via the touch-sensing panel. The fingerprint template and the physical characteristic are served as a newly added registered template.

To sum up, in the embodiments of the invention, the fingerprint sensor can sense the fingerprint of the object to obtain the fingerprint template. During a period of sensing the fingerprint of the object, the touch-sensing panel can sense the touch area of the object in the touch-sensing area. The processing circuit can determine the finger attribute of the object according to the physical characteristics of the touch area. According to the finger attribute, the processing circuit can select one (or more) registered templates related to the finger attribute from the registered templates, so as to perform the fingerprint matching on the fingerprint template. The processing circuit can select the registered fingerprint, without according to the order of the registered fingerprints in the database. Thus, the fingerprint identification device and method provided by the embodiments of the invention can enhance the efficiency of the fingerprint matching.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
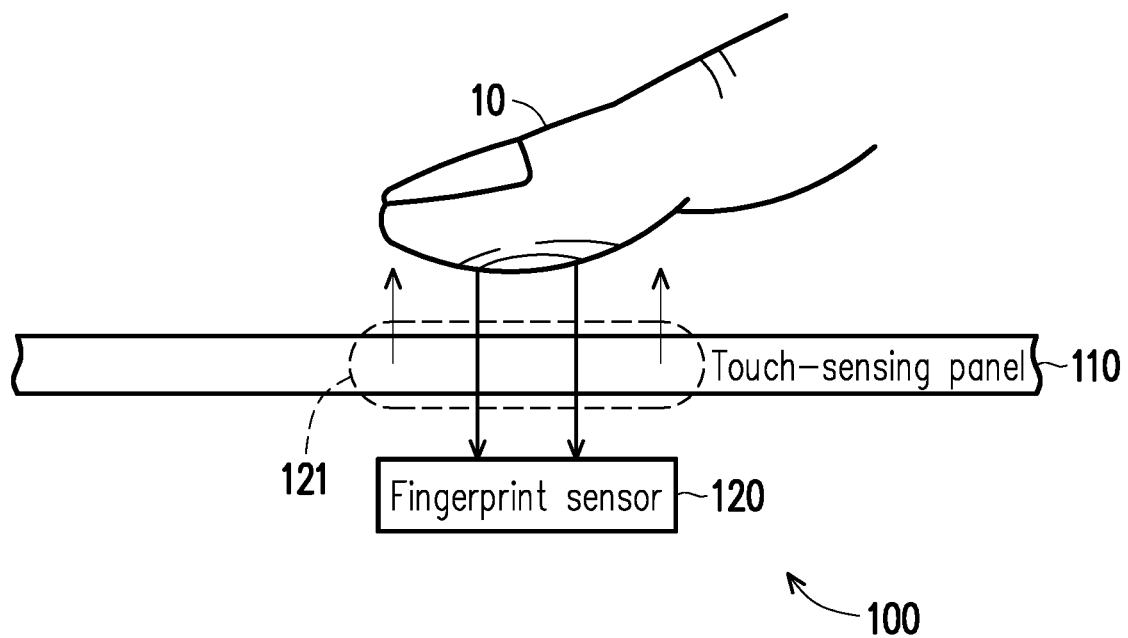
FIG. 1 is a schematic diagram illustrating an operation scenario of a fingerprint identification device according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. The terms "first" and "second" mentioned in the full text of the specification (including the claims) are used to name the elements, or for distinguishing different embodiments or scopes, instead of restricting the upper limit or the lower limit of the numbers of the elements, nor limiting the order of the elements. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic diagram illustrating an operation scenario of a fingerprint identification device 100 according to an embodiment of the invention. FIG. 1 illustrates a schematic cross-section diagram of the fingerprint identification device 100. The fingerprint identification device 100 illustrated in FIG. 1 includes a touch-sensing panel 110 and a fingerprint sensor 120. Based on a design requirement, the touch-sensing panel 110 may be any type of touch panel, for example, a capacitive sensing panel, a pressure sensing panel, an optical sensing panel or other touch panels. In some embodiments, the touch-sensing panel 110 may be a touch display panel, i.e., the touch-sensing panel 110 may be capable of displaying and touch sensing. Based on a design requirement, the touch display panel may be a conventional touch display panel or other touch display panels.

The fingerprint sensor 120 is disposed under the touch-sensing panel 110. The fingerprint sensor 120 may detect/capture a fingerprint image of an object 10 (for example, a finger) via the touch-sensing panel 110. Thus, a fingerprint sensing area 121 of the fingerprint sensor 120 is located in a touch-sensing area of the touch-sensing panel 110. To be detailed, when the object 10 contacts the touch-sensing area of the touch-sensing panel 110, the light provided by a light source may be irradiated on the object 10, such that the fingerprint sensor 120 may detect/capture the fingerprint image of the object 10. In the embodiment illustrated in FIG. 1, the touch-sensing panel 110 may be served as a light source to provide the light to the object 10. In a condition that the touch-sensing panel 110 is implemented by the touch display panel, a backlight source of the touch display panel may be served as the light source to provide the light to the object 10. In other embodiments, in a condition that the touch-sensing panel 110 is incapable of providing the light, an additional light source (not shown) may be disposed under the touch-sensing panel 110, so as to provide the light to the object 10.

Figure 2:
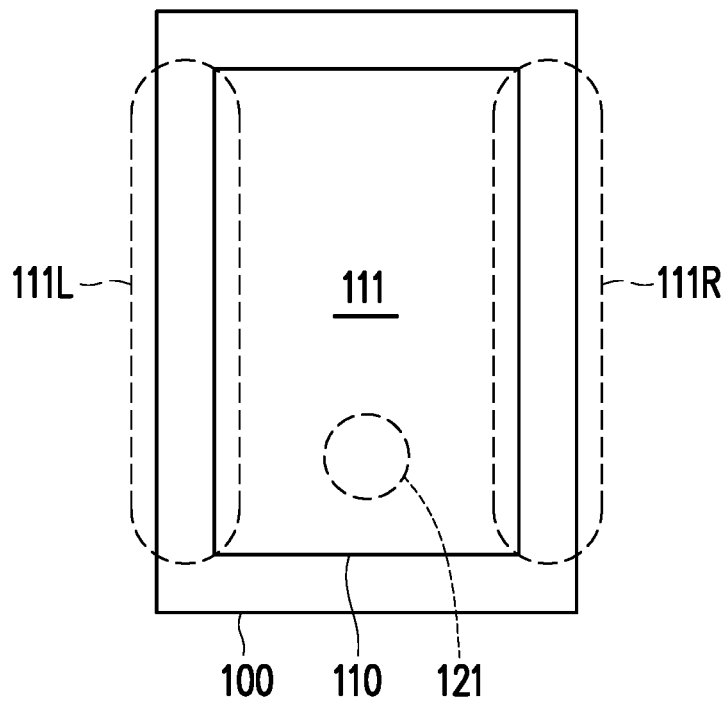
FIG. 2 is a schematic top-view diagram illustrating the fingerprint identification device depicted in FIG. 1 according to an embodiment of the invention.

FIG. 2 is a schematic top-view diagram illustrating the fingerprint identification device 100 depicted in FIG. 1 according to an embodiment of the invention. Referring to FIG. 1 and FIG. 2, the fingerprint sensor 120 is disposed under the touch-sensing panel 110, wherein the fingerprint sensing area 121 of the fingerprint sensor 120 is located in a touch-sensing area 111 of the touch-sensing panel 110.

Figure 3:
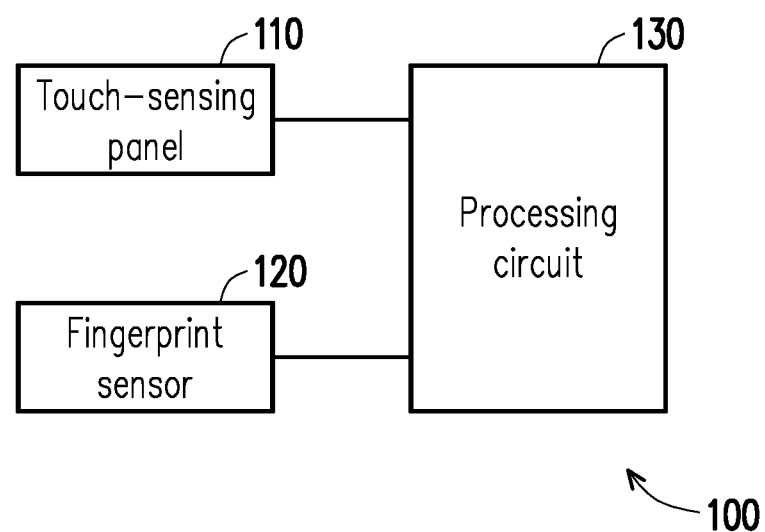
FIG. 3 is schematic circuit block diagram illustrating a fingerprint identification device according to an embodiment of the invention.

FIG. 3 is schematic circuit block diagram illustrating a fingerprint identification device 100 according to an embodiment of the invention. The fingerprint identification device 100 includes a touch-sensing panel 110, a fingerprint sensor 120 and a processing circuit 130. The processing circuit 130 is coupled to the touch-sensing panel 110 and the fingerprint sensor 120. The touch-sensing panel 110 and the fingerprint sensor 120 illustrated in FIG. 3 may be inferred with reference to the descriptions related to the embodiments illustrated in FIG. 1 and FIG. 2 and thus, will not be repeated.

Based on a design requirement, the processing circuit 130 may include a touch sensing module, an analysis module, a processing module and/or a storage module. The touch sensing module (not shown) of the processing circuit 130 may detect information related to a touch of a current user. The touch sensing module may obtain the detection information, for example, an energy change (an energy change of the fingerprint sensing area 121), coordinate information (a coordinate of a touch area of the object 10), an area size, a pressure size and/or other information, of the touch-sensing panel 110. The touch sensing module (not shown) of the processing circuit 130 may also detect a touch behavior of the object 10 (for example, a single click, multiple clicks and so on).

The analysis module (not shown) of the processing circuit 130 may analyze a finger pressed by the user according to the information transmitted from the touch-sensing panel 110. For example, the analysis module may determine whether the finger belongs to the left hand or the right hand according to a range of the energy change. The detailed content related to "the processing circuit 130 determining it as belonging to the left hand or the right hand" will be described in detail below. Based on a design requirement, the analysis module may record the area size, the pressing pressure size of the touch area of the object 10 and/or the other information of the touch area of the object 10.

The processing module (not shown) of the processing circuit 130 may receive the information of the analysis module (not shown) of the processing circuit 130. The processing module controls operation processes of fingerprint registration controlling and/or fingerprint matching. Regarding the fingerprint registration, when the registration ends, the processing module may store information of the object 10, which includes fingerprint characteristics (fingerprint templates), a finger attribute (for example, the left or the right hand), physical characteristics (for example, a pressing area, a pressing force (i.e., a pressure value) and/or other information of the registration). Regarding the fingerprint matching, the processing module may determine priorities of the registered templates by comparing with the information of the analysis module (not shown). The detailed content related to "the processing circuit 130 determining the priorities of the registered templates" will be described in detail below.

The storage module (not shown) of the processing circuit 130 may receive commands from the processing module (not shown). Based on a design requirement, the storage module may be a non-volatile memory or any other type of memory. The storage module may store data related to registered fingerprints (i.e., registered templates).

Figure 4:
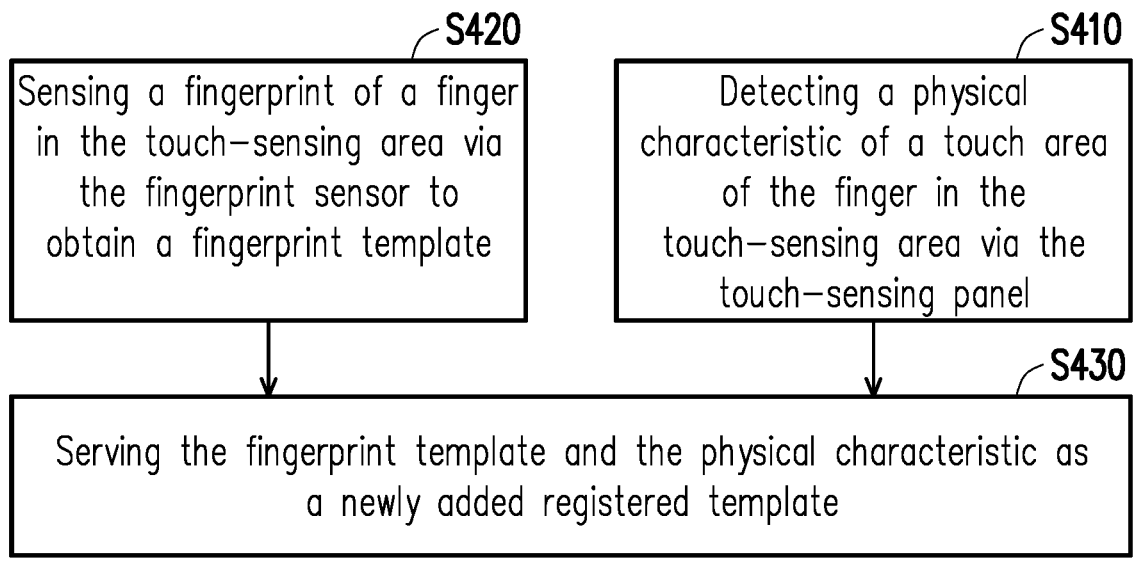
FIG. 4 is a flowchart illustrating a fingerprint identification method according to an embodiment of the invention.

FIG. 4 is a flowchart illustrating a fingerprint identification method according to an embodiment of the invention. FIG. 4 illustrates a fingerprint registration process. Referring to FIG. 3 and FIG. 4, first, the fingerprint sensor 120 is disposed under the touch-sensing panel 110, as illustrated in FIG. 1 and FIG. 2. In a registration mode, the processing circuit 130 senses a fingerprint of the finger (i.e., the object 10) via the fingerprint sensor 120 to obtain a fingerprint template (step S410). The processing circuit 130 detects a physical characteristic of a touch area of the finger (i.e., the object 10) in the touch-sensing area 111 via the touch-sensing panel 110 (step S420). The processing circuit 130 serves the fingerprint template and the physical characteristic as a newly added registered template (step S430), and this registered template is added/stored in a database.

Figure 5:
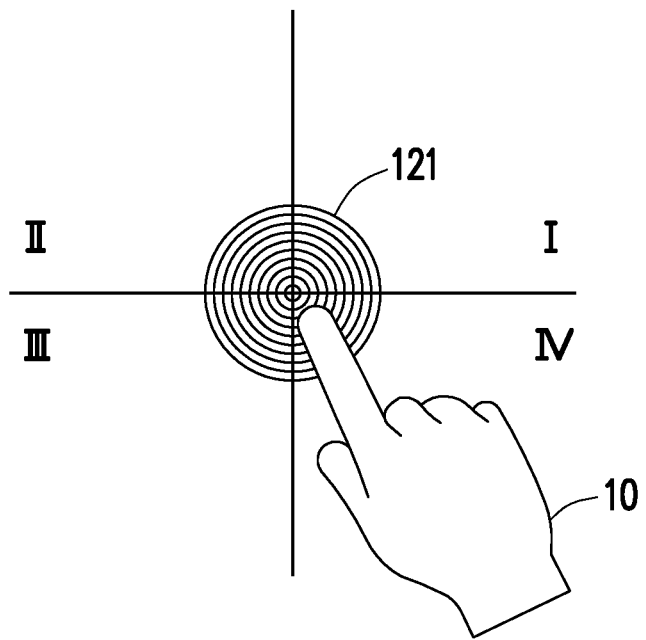
FIG. 5 is a schematic diagram illustrating an operation scenario of the fingerprint identification device depicted in FIG. 1 and FIG. 2.

For example, FIG. 5 is a schematic diagram illustrating an operation scenario of the fingerprint identification device 100 depicted in FIG. 1 and FIG. 2. When the object 10 (for example, the right forefinger) contacts the touch-sensing area 111 of the touch-sensing panel 110, the processing circuit 130 may sense a touch area of the object 10 in the touch-sensing area 111 via the touch-sensing panel 110.

Figure 6:
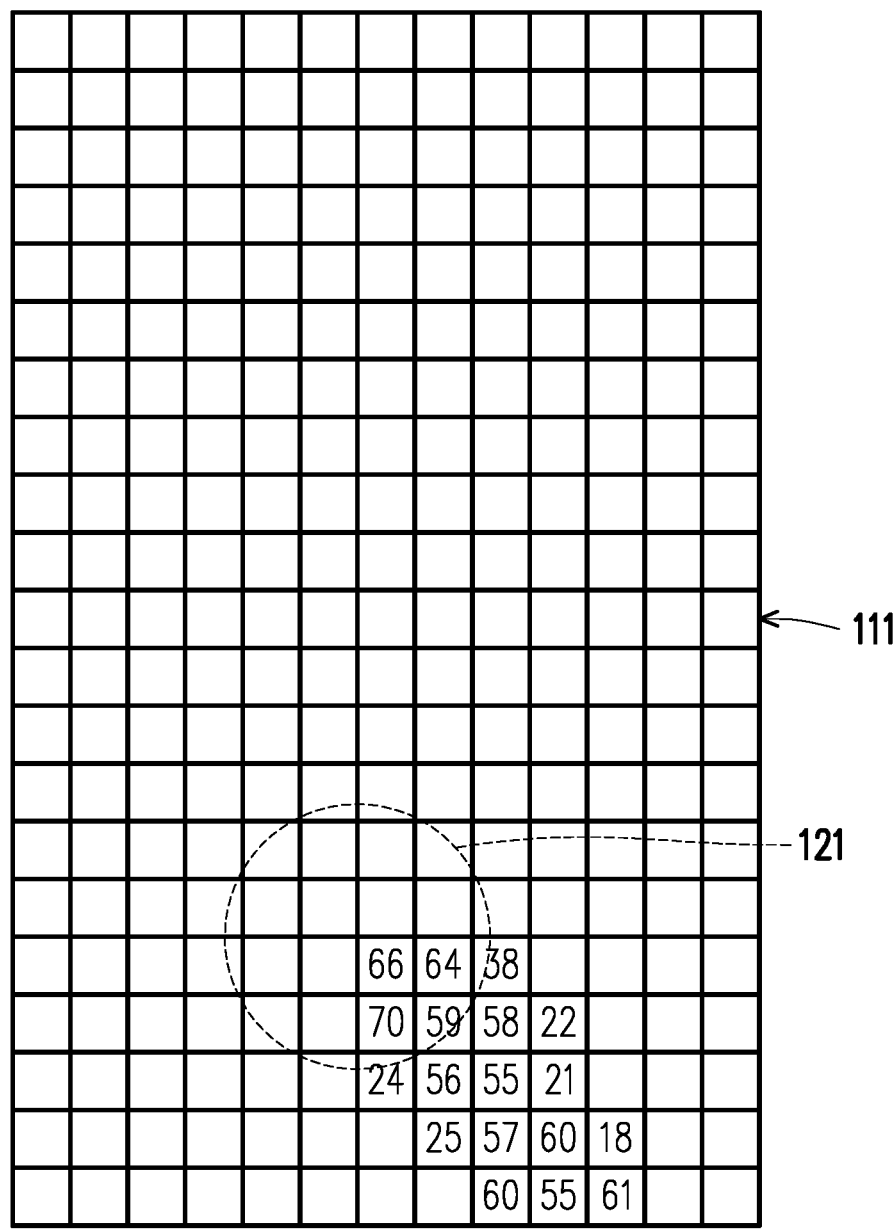
FIG. 6 is a schematic diagram illustrating an example of the touch-sensing area of the touch-sensing panel.

FIG. 6 is a schematic diagram illustrating an example of the touch-sensing area 111 of the touch-sensing panel 110. Each grid illustrated in FIG. 6 represents a sensing unit of the touch-sensing panel 110. The number of the grids illustrated in FIG. 6 is only illustrated for exemplification, and in other embodiments, the resolution of the touch-sensing panel 110 should not be limited to that illustrated in FIG. 6. The grids with no numbers in FIG. 6 represent the sensing units where no touch event is detected, and the numbers in the grids illustrated in FIG. 6 represent sensing results (energy information) of the sensing units where a touch event is detected.

Referring to FIG. 5 and FIG. 6, when the right forefinger (i.e., the object 10) contacts the touch-sensing area 111 of the touch-sensing panel 110, the processing circuit 130 may sense the touch area of the object 10 in the touch-sensing area 111 via the touch-sensing panel 110. The grids with numbers in FIG. 6 may represent the touch area of the object 10. When the touch area of the object 10 overlaps a part or the whole of the fingerprint sensing area 121, the processing circuit 130 may sense a fingerprint of the right forefinger (i.e., the object 10) via the fingerprint sensor 120 to obtain a fingerprint template (step S410). In addition, the processing circuit 130 may detect a physical characteristic of the touch area of the right forefinger (i.e., the object 10) in the touch-sensing area 111 via the touch-sensing panel 110 (step S420). The processing circuit 130 may serve the fingerprint template and the physical characteristic as a newly added registered template (step S430).

The physical characteristic may be defined based on a design requirement. For example, in some embodiments, the physical characteristic may include a long-axis direction of the touch area of the object 10. Namely, the processing circuit 130 may determine a finger attribute of the object 10 according to the long-axis direction of the touch area of the object 10. For descriptive convenience, the first quadrant I, the second quadrant II, the third quadrant III and the fourth quadrant IV in a mathematical vertical coordinate system are used to define the direction. As illustrated in FIG. 5, if the fingerprint sensing area 121 is employed as the origin in the vertical coordinate system, the first quadrant of the fingerprint sensing area 121 is labeled by "I", the second quadrant of the fingerprint sensing area 121 is labeled by "II", the third quadrant of the fingerprint sensing area 121 is labeled by "III", and the fourth quadrant of the fingerprint sensing area 121 is labeled by "IV".

When the right forefinger (i.e., the object 10) contacts the fingerprint sensing area 121, generally, the long-axis direction of the touch area of the object 10 extends from the fingerprint sensing area 121 toward the fourth quadrant IV of the fingerprint sensing area 121 (as illustrated in FIG. 6). Thus, when the long-axis direction of the touch area of the object 10 extends from the fingerprint sensing area 121 toward the fourth quadrant IV of the fingerprint sensing area 121, the processing circuit 130 may determine the finger attribute of the object 10 as a right-hand finger (step S420). The processing circuit 130 may serve the fingerprint template and the physical characteristic representing the "right-hand finger" as the newly added registered template (step S430).

Figure 7:
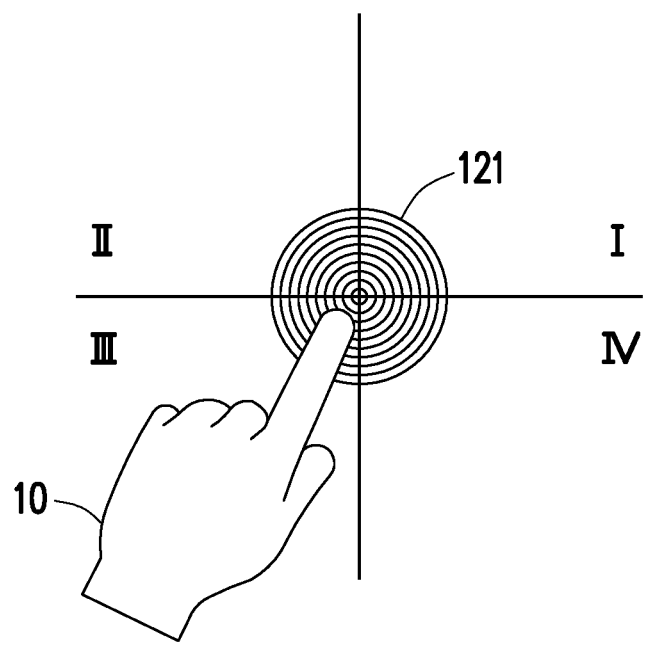
FIG. 7 is a schematic diagram illustrating another operation scenario of the fingerprint identification device depicted in FIG. 1 and FIG. 2.
Figure 8:
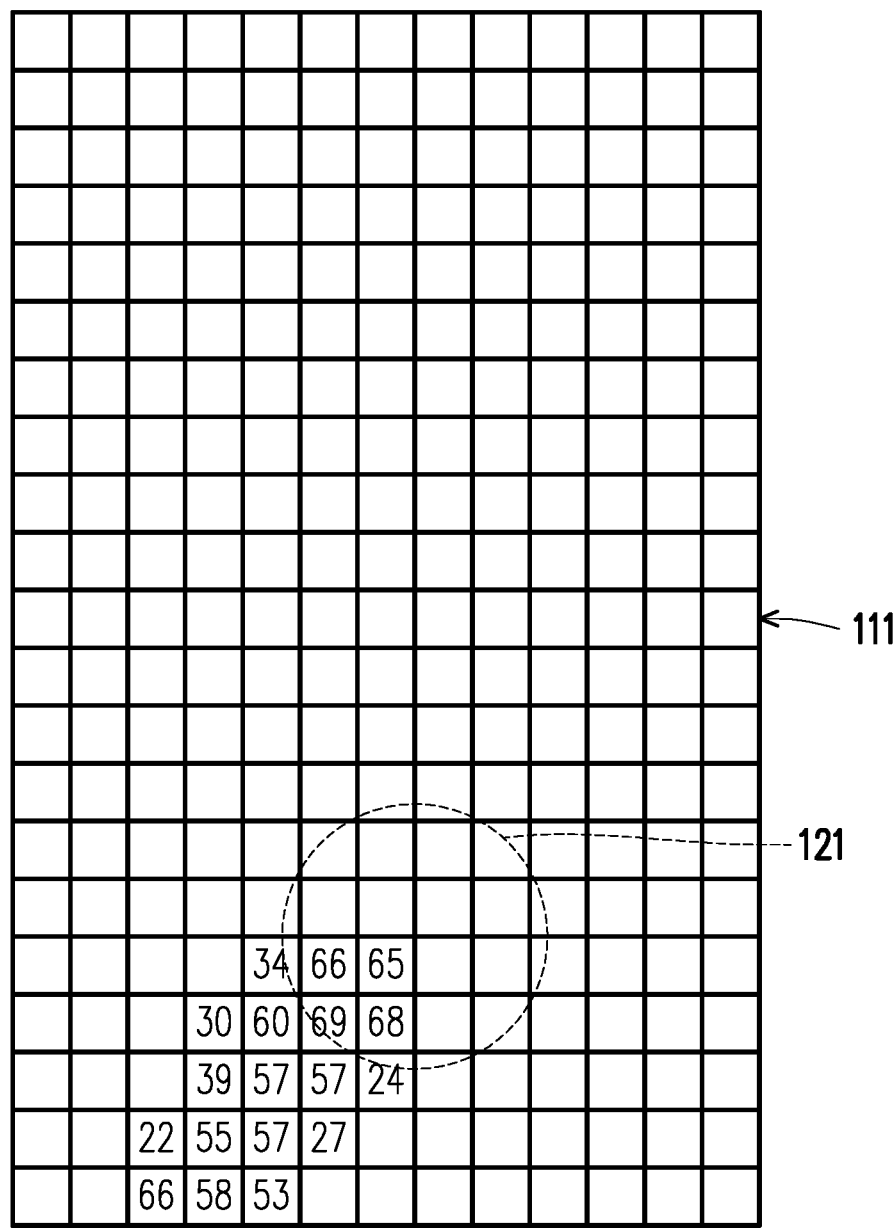
FIG. 8 is a schematic diagram illustrating another example of the touch-sensing area of the touch-sensing panel.

FIG. 7 is a schematic diagram illustrating another operation scenario of the fingerprint identification device 100 depicted in FIG. 1 and FIG. 2. FIG. 8 is a schematic diagram illustrating another example of the touch-sensing area 111 of the touch-sensing panel 110. Each grid illustrated in FIG. 8 represents a sensing unit of the touch-sensing panel 110. In other embodiments, the resolution of the touch-sensing panel 110 should not be limited to that illustrated in FIG. 8. The grids with no numbers in FIG. 8 represent the sensing units where no touch event is detected, and the numbers in the grids illustrated in FIG. 8 represent sensing results (energy information) of the sensing units where a touch event is detected.

Referring to FIG. 7 and FIG. 8, when the object 10 (for example, the left forefinger) contacts the touch-sensing area 111 of the touch-sensing panel 110, the processing circuit 130 may sense a touch area of the object 10 in the touch-sensing area 111 via the touch-sensing panel 110. The grids with numbers in FIG. 8 may represent the touch area of the object 10. When the touch area of the object 10 overlaps a part or the whole of the fingerprint sensing area 121, the processing circuit 130 may sense a fingerprint of the left forefinger (i.e., the object 10) via the fingerprint sensor 120 to obtain a fingerprint template (step S410). In addition, the processing circuit 130 may detect a physical characteristic of the touch area of the left forefinger (i.e., the object 10) in the touch-sensing area 111 via the touch-sensing panel 110 (step S420). The processing circuit 130 may serve the fingerprint template and the physical characteristic as a newly added registered template (step S430).

When the left forefinger (i.e., the object 10) contacts the fingerprint sensing area 121, generally, the long-axis direction of the touch area of the object 10 extends from the fingerprint sensing area 121 toward the third quadrant III of the fingerprint sensing area 121 (as illustrated in FIG. 6). Thus, when the long-axis direction of the touch area of the object 10 extends from the fingerprint sensing area 121 toward the third quadrant III of the fingerprint sensing area 121, the processing circuit 130 may determine the finger attribute of the object 10 as a left-hand finger (step S420). The processing circuit 130 may serve the fingerprint template and the physical characteristic representing the "right-hand finger" as the newly added registered template (step S430).

Further, for example, in some other embodiments, the physical characteristic of the touch area of the finger (i.e., the object 10) may includes an area of the touch area of the object 10. Namely, the processing circuit 130 may determine the finger attribute of the object 10 according to the area of the touch area of the object 10 (step S420). For example, when the area of the touch area of the object 10 is greater than a threshold, the processing circuit 130 may determine the finger attribute of the object 10 as a thumb. The threshold may be determined based on a design requirement. The processing circuit 130 may serve the fingerprint template and the physical characteristic representing the "thumb" as a newly added registered template (step S430).

Moreover, for example, in some other embodiments, the touch-sensing panel 110 may also sense a pressing energy (i.e., a pressure) of the object 10 (for example, a finger). The physical characteristic of the touch area of the finger (i.e., the object 10) may include the pressure of the touch area of the object 10. Namely, the processing circuit 130 may determine the finger attribute of the object 10 according to the pressure of the touch area of the object 10 (step S420). For example, when the pressure of the touch area of the object 10 is greater than a threshold, the processing circuit 130 may determine the finger attribute of the object 10 as a thumb. The threshold may be determined based on a design requirement. The processing circuit 130 may serve the fingerprint template and the physical characteristic representing the "thumb" as a newly added registered template (step S430).

Figure 9:
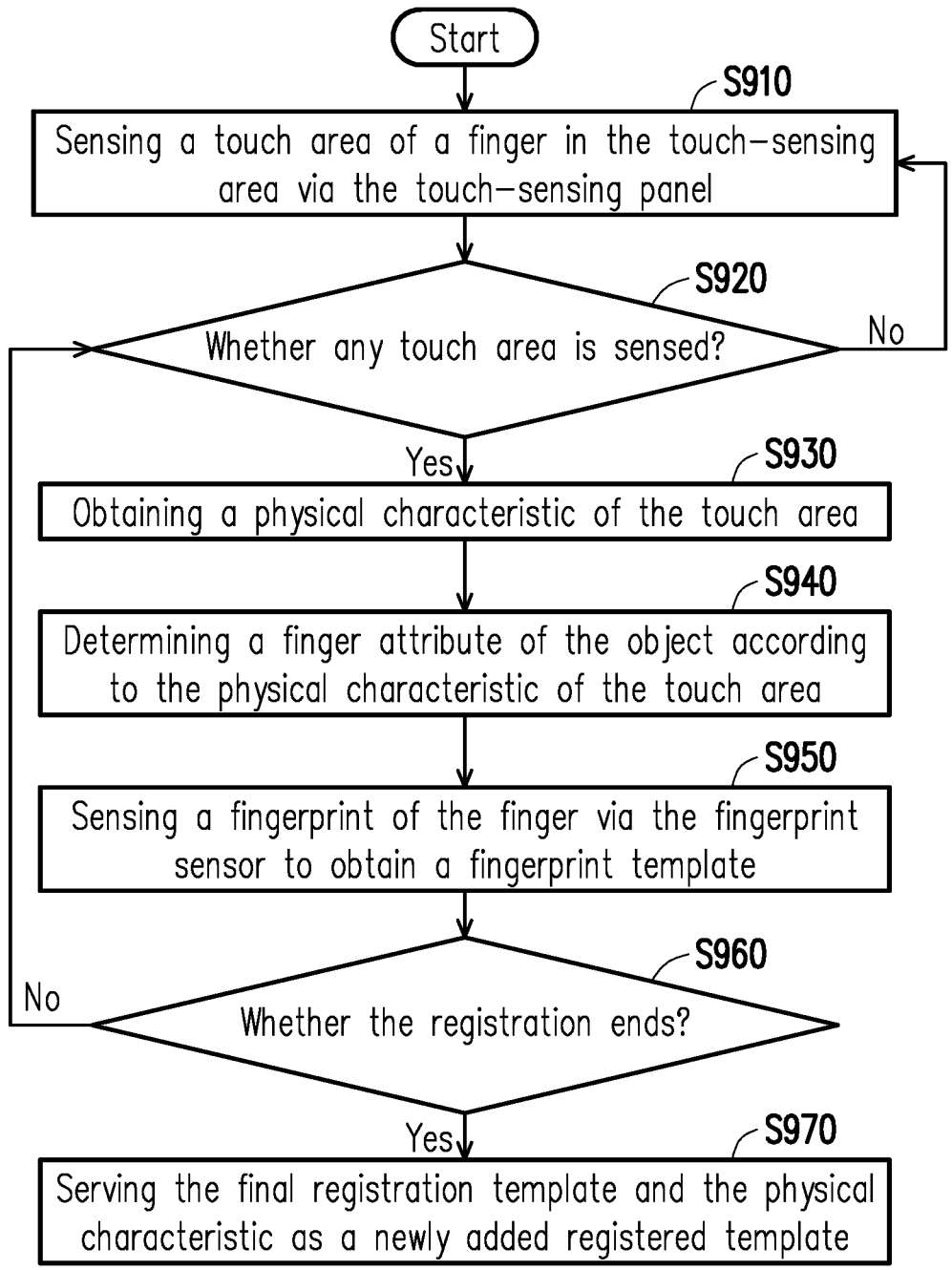
FIG. 9 is a flowchart illustrating a fingerprint identification method according to another embodiment of the invention.

FIG. 9 is a flowchart illustrating a fingerprint identification method according to another embodiment of the invention. FIG. 9 illustrates a fingerprint registration process. Referring to FIG. 3 and FIG. 9, in a registration mode, the processing circuit 130 may sense a touch area of a finger (i.e., the object 10) in the touch-sensing area 111 via the touch-sensing panel 110 (step S910). When not sensing the touch area of the finger (i.e., the object 10) (i.e., the result of step S920 is "No"), the processing circuit 130 again performs step S910. When sensing the touch area of the finger (i.e., the object 10) (i.e., the result of step S920 is "Yes"), the processing circuit 130 performs step S930.

In step S930, the processing circuit 130 may obtain a physical characteristic of the touch area of the object 10 (for example, the finger) in the touch-sensing area 111 via the touch-sensing panel 110. In step S940, the processing circuit 130 may determine a finger attribute of the object 10 according to the physical characteristic of the touch area of the object 10. Detailed implementation examples of step S930 and step S940 illustrated in FIG. 9 may be inferred with reference to the description related to step S420 illustrated in FIG. 4 and thus, will not be repeated.

In step S950, the processing circuit 130 may sense a fingerprint of the finger (i.e., the object 10) via the fingerprint sensor 120 to obtain a fingerprint template. A detailed implementation example of step S950 illustrated in FIG. 9 may be inferred with reference to the description related to step S410 illustrated in FIG. 4 and thus, will not be repeated.

Generally, in a registration operation of a fingerprint, a finger fingerprint is sensed/captured for many times to obtain a plurality of fingerprint templates of the same finger fingerprint. The processing circuit 130 may stitch the fingerprint templates to obtain a final registration template. When the registration operation performed on the same finger fingerprint does not yet end (i.e., the result of step S960 is "No"), the processing circuit 130 again performs step S920 to step S950. When the registration operation performed on the same finger fingerprint already ends (i.e., the result of step S960 is "Yes"), the processing circuit 130 performs step S970. In step S970, the processing circuit 130 may serve the final registration template and the physical characteristic (the finger attribute) as a newly added registered template. A detailed implementation example of step S970 illustrated in FIG. 9 may be inferred with reference to the description related to step S430 illustrated in FIG. 4 and thus, will not be repeated.

Figure 10:
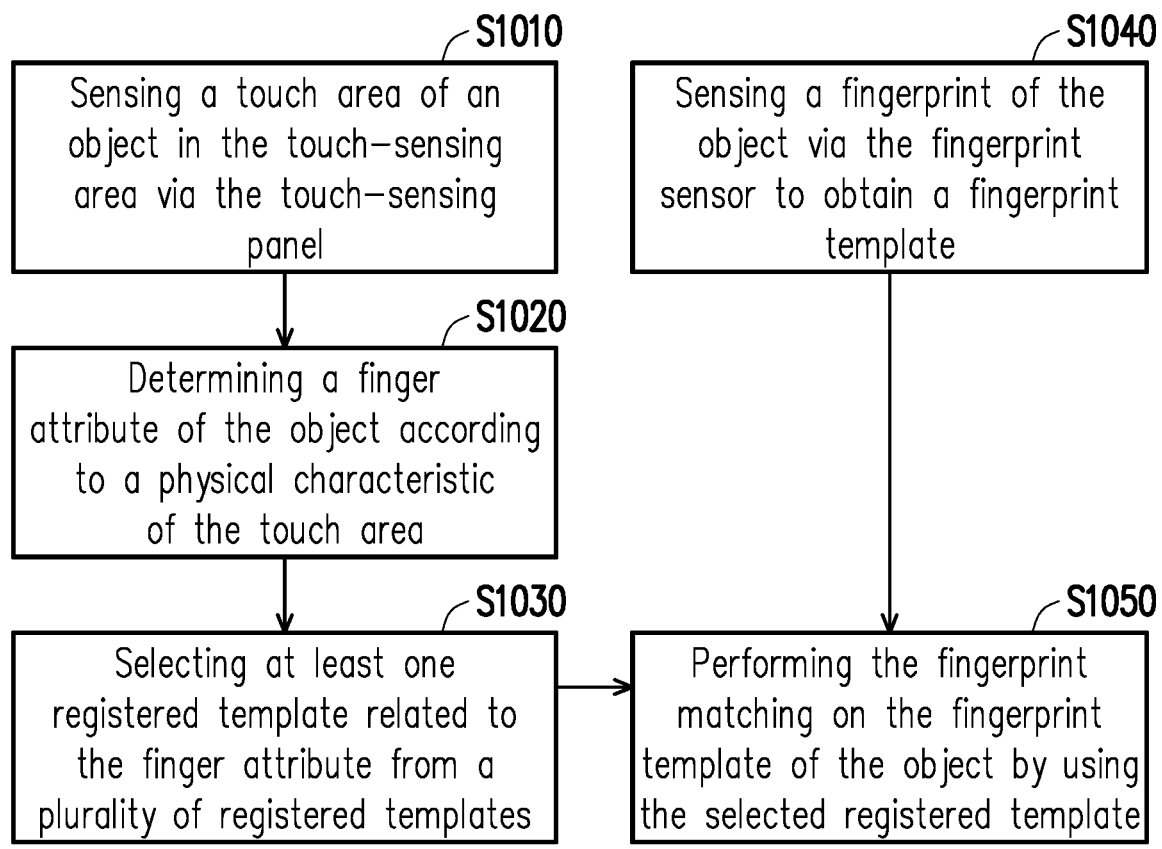
FIG. 10 is a flowchart illustrating a fingerprint identification method according to another embodiment of the invention.

FIG. 10 is a flowchart illustrating a fingerprint identification method according to another embodiment of the invention. FIG. 10 illustrates a process of fingerprint matching. Referring to FIG. 3 and FIG. 10, when the object 10 contacts the touch-sensing area 111 of the touch-sensing panel 110, the processing circuit 130 may sense a touch area of the object 10 in the touch-sensing area 111 via the touch-sensing panel 110 (step S1010). The processing circuit 130 may determine a finger attribute of the object 10 according to a physical characteristic of the touch area of the object 10 (step S1020). Detailed implementation examples of step S1010 and step S1020 illustrated in FIG. 10 may be inferred with reference to the description related to step S420 illustrated in FIG. 4 or with reference to the descriptions related to step S910, step S930 and step S940 illustrated in FIG. 9 and thus, will not be repeated.

In step S1030, according to the finger attribute of the object 10, the processing circuit 130 may select at least one registered template related to the finger attribute of the object 10 from a plurality of registered templates, so as to perform fingerprint matching (step S1050). The registered templates may be stored in a database (not shown) in advance. In some embodiments, the registered templates may be obtained by the fingerprint registration process illustrated in FIG. 4 or FIG. 9. In any way, the manner to obtain the registered templates is not limited to the fingerprint registration process illustrated in FIG. 4 or FIG. 9.

When the touch area of the object 10 overlaps a part or the whole of the fingerprint sensing area 121 of the fingerprint sensor 120, the processing circuit 130 may sense a fingerprint of the object 10 via the fingerprint sensor 120 to obtain a fingerprint template (step S1040). In step S1050, the processing circuit 130 may use the registered template selected in step S1030 to perform the fingerprint matching on the fingerprint template of the object 10. Because the registered template selected in step S1030 is highly related to the object 10, the efficiency of the fingerprint matching may be effectively enhanced.

For example, it is assumed that the registered templates of the 10 fingers of a user are stored in a database (not shown) according to a specific order, wherein the $9^{th}$ and $10^{th}$ positions in the order respectively correspond to the registered template of the right forefinger and the registered template of the left forefinger. Referring to the descriptions related to FIG. 5 and FIG. 6, when the right forefinger (i.e., the object 10) contacts the fingerprint sensing area 121, because the long-axis direction of the touch area of the object 10 extends from the fingerprint sensing area 121 toward the fourth quadrant IV of the fingerprint sensing area 121, the processing circuit 130, in step S1020, may determine the finger attribute of the object 10 as a "right-hand finger". Thus, the processing circuit 130, in step S1030, may select 5 registered templates related to the "right-hand finger" from the 10 registered templates according to the finger attribute of the object 10, so as to perform the fingerprint matching on the fingerprint template of the object 10 in step S1050. Thus, the processing circuit 130 of the present embodiment may determine that the fingerprint template of the object 10 is valid after performing the fingerprint matching for the $5^{th}$ time at most. On the contrary, in the conventional fingerprint matching technique, because the processing circuit selects one by one from the 10 registered templates according to the order (which is a fixed order), the processing circuit may not determine that the fingerprint template of the object 10 is valid until the processing circuit performs the fingerprint matching for the $9^{th}$ time.

Further, for example, referring to the description related to FIG. 7 and FIG. 8, when the left forefinger (i.e., the object 10) contacts the fingerprint sensing area 121, because the long-axis direction of the touch area of the object 10 extends from the fingerprint sensing area 121 toward the third quadrant III of the fingerprint sensing area 121, the processing circuit 130, in step S1020, may determine the finger attribute of the object 10 as a "left-hand finger". Thus, the processing circuit 130, in step S1030, may select 5 registered templates related to the "left-hand finger" from the 10 registered templates according to the finger attribute of the object 10, so as to perform the fingerprint matching on the fingerprint template of the object 10 in step S1050. Thus, the processing circuit 130 of the present embodiment may determine that the fingerprint template of the object 10 is valid after performing the fingerprint matching for the $5^{th}$ time at most. On the contrary, in the conventional fingerprint matching technique, because the processing circuit selects one by one from the 10 registered templates according to the order (which is a fixed order), the processing circuit may not determine that the fingerprint template of the object 10 is valid until the processing circuit performs the fingerprint matching for the $10^{th}$ time.

In some embodiments, the physical characteristic of the touch area of the object 10 (for example, the finger) may include the area of the touch area of the object 10. Namely, the processing circuit 130 may determine the finger attribute of the object 10 according to the area of the touch area of the object 10 (step S1020). For example, when the area of the touch area of the object 10 is greater than a threshold, the processing circuit 130 may determine the finger attribute of the object 10 as a thumb. The threshold may be determined based on a design requirement. The processing circuit 130 may select the registered template related to the "thumb" from the registered templates according to the finger attribute of the object 10 (step S1030), so as to perform the fingerprint matching on the fingerprint template of the object 10 (step S1050).

In some other embodiments, the touch-sensing panel 110 may also sense a pressing energy (a pressure) of the object 10 (for example, the finger). The physical characteristic of the touch area of the object 10 (for example, the finger) may include the pressure of the touch area of the object 10. Namely, the processing circuit 130 may determine the finger attribute of the object 10 according to the pressure of the touch area of the object 10 (step S1020). For example, when the pressure of the touch area of the object 10 is greater than a threshold, the processing circuit 130 may determine the finger attribute of the object 10 as a thumb. The threshold may be determined based on a design requirement. The processing circuit 130 may select the registered template related to the "thumb" according to the finger attribute of the object 10 from the registered templates (step S1030), so as to perform the fingerprint matching on the fingerprint template of the object 10 (step S1050).

Figure 11:
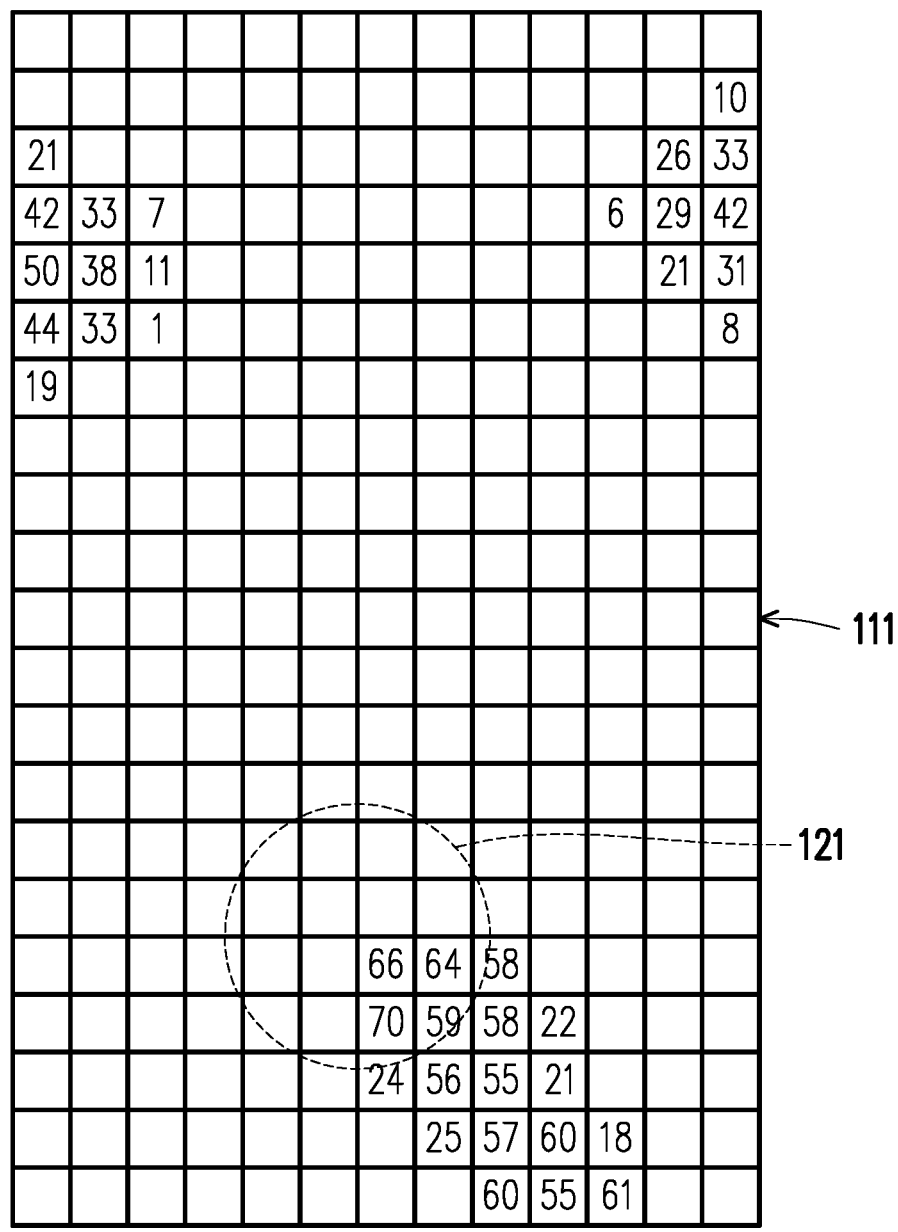
FIG. 11 is a schematic diagram illustrating yet another example of the touch-sensing area of the touch-sensing panel.

FIG. 11 is a schematic diagram illustrating yet another example of the touch-sensing area 111 of the touch-sensing panel 110. Each grid illustrated in FIG. 11 represents a sensing unit of the touch-sensing panel 110. In other embodiments, the resolution of the touch-sensing panel 110 should not be limited to that illustrated in FIG. 11. The grids with no numbers in FIG. 11 represent the sensing units where no touch event is detected, and the numbers in the grids illustrated in FIG. 11 represent the sensing results (energy information) of the sensing units where a touch event is detected. Referring to FIG. 2 and FIG. 11, the right edge 111R of the touch-sensing area 111 is located to the right of the fingerprint sensing area 121, and the left edge 111L of the touch-sensing area 111 is located to the left of the fingerprint sensing area 121. According to FIG. 11, it may be seen that the touch-sensing area 111 has three touch areas. The scenario illustrated in FIG. 11 is that the user holds the fingerprint identification device 100 by the left palm, wherein the user touches the right edge 111R of the touch-sensing area 111 by the left forefinger and touches the left edge 111L of the touch-sensing area 111 by the left thumb. When the processing circuit 130 detects that the right edge 111R of the touch-sensing area 111 has a touch area and the left edge 111L of the touch-sensing area 111 has another touch area via the touch-sensing panel 110, and when the long-axis direction of the touch area of the object 10 extends from the fingerprint sensing area 121 toward the fourth quadrant IV of the fingerprint sensing area 121, the processing circuit 130 may determine the finger attribute of the object 10 as a right-hand finger (step S1020). The processing circuit 130 may select the registered template related to the right-hand finger from the registered templates according to the finger attribute of the object 10 (step S1030), so as to perform the fingerprint matching on the fingerprint template of the object 10 (step S1050).

Figure 12:
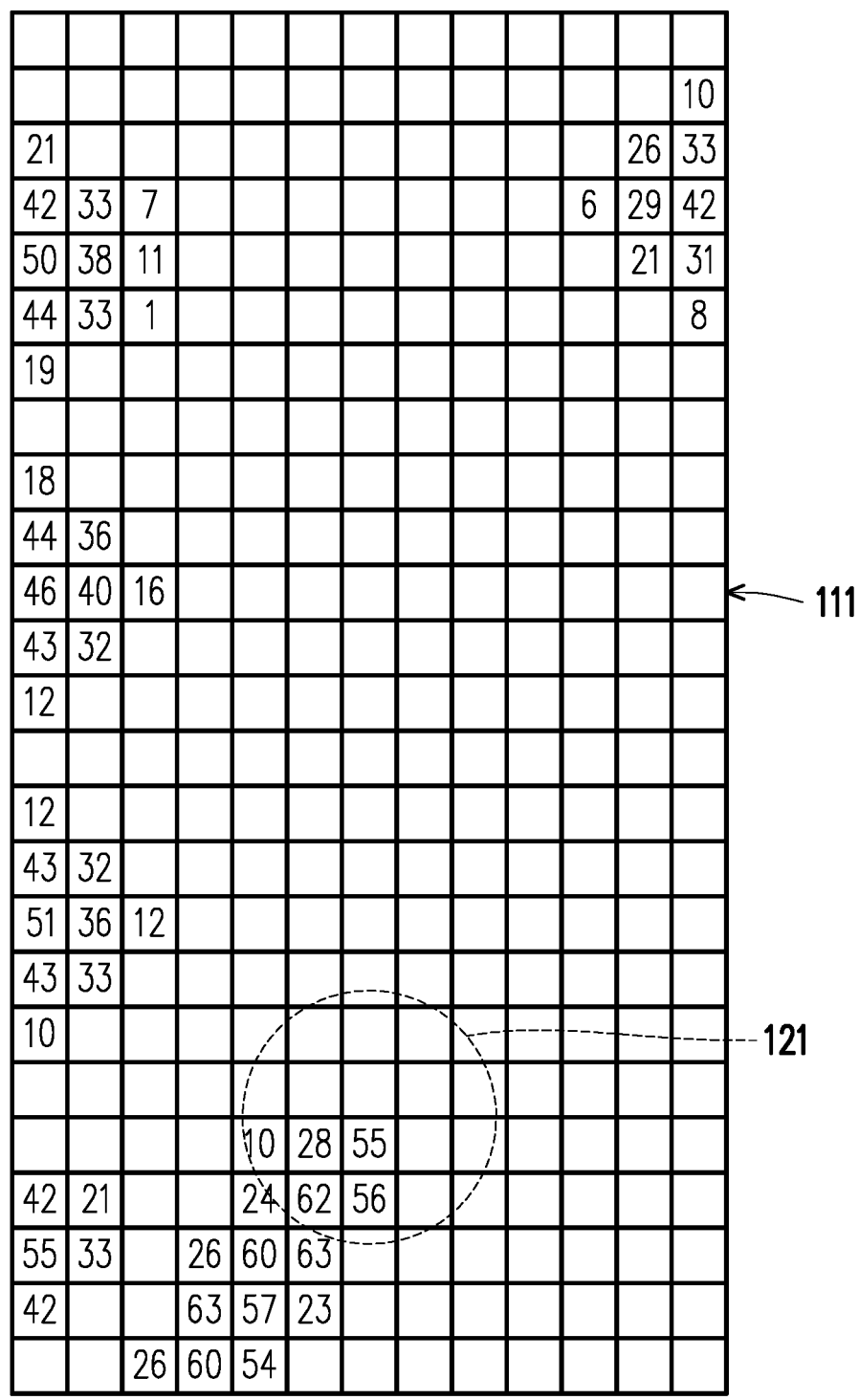
FIG. 12 is a schematic diagram illustrating still another example of the touch-sensing area of the touch-sensing panel.

FIG. 12 is a schematic diagram illustrating still another example of the touch-sensing area 111 of the touch-sensing panel 11. Each grid illustrated in FIG. 12 represents a sensing unit of the touch-sensing panel 110. In other embodiments, the resolution of the touch-sensing panel 110 should not be limited to that illustrated in FIG. 12. The grids with no numbers in FIG. 12 represent the sensing units where no touch event is detected, and the numbers in the grids in FIG. 12 represent the sensing results (energy information) of the sensing units where a touch event is detected. Referring to FIG. 2 and FIG. 12, the right edge 111R of the touch-sensing area 111 is located to the right of the fingerprint sensing area 121, and the left edge 111L of the touch-sensing area 111 is located to the left of the fingerprint sensing area 121. According to FIG. 12, the touch-sensing area 111 has 6 touch areas. The scenario illustrated in FIG. 12 is that the user holds the fingerprint identification device 100 by the right palm, wherein the user touches the right edge 111R of the touch-sensing area 111 by the right thumb and touches the left edge 111L of the touch-sensing area 111 by the forefinger, the middle finger, the ring finger and the little finger of the right hand. When the processing circuit 130 detects that the right edge 111R of the touch-sensing area 111 has a touch area and the left edge 111L of the touch-sensing area 111 has four touch areas via the touch-sensing panel 110, and when the long-axis direction of the touch area of the object 10 extends from the fingerprint sensing area 121 toward the third quadrant III of the fingerprint sensing area 121, the processing circuit 130 may determine the finger attribute of the object 10 as a left-hand finger (step S1020). The processing circuit 130 may select the registered template related to the left-hand finger from the registered templates according to the finger attribute of the object 10 (step S1030), so as to perform the fingerprint matching on the fingerprint template of the object 10 (step S1050).

Figure 13:
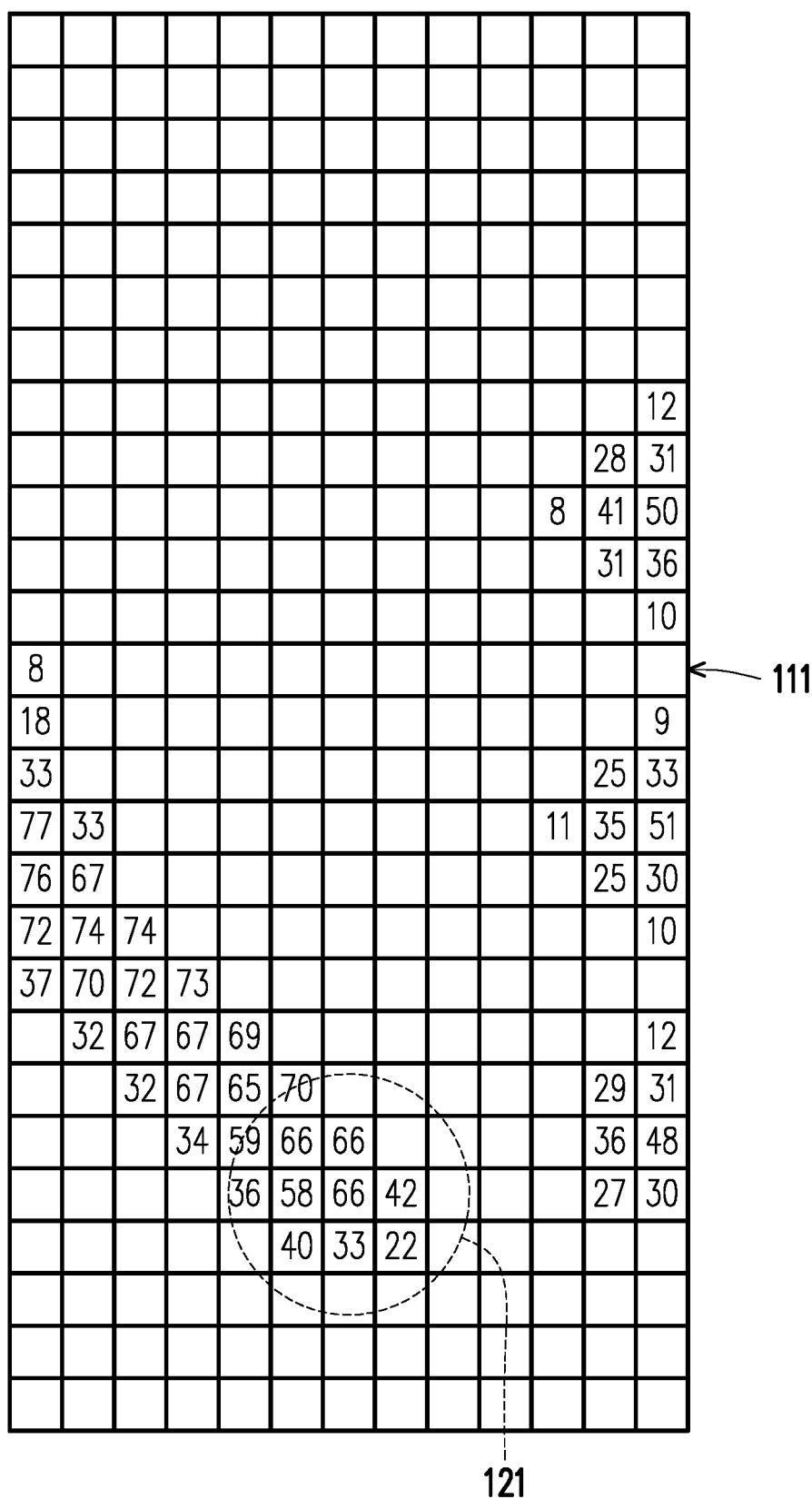
FIG. 13 is a schematic diagram illustrating further another example of the touch-sensing area of the touch-sensing panel.

In some use scenarios, the user may hold by one hand and operate the fingerprint identification device 100 (for example, a smart phone). FIG. 13 is a schematic diagram illustrating further another example of the touch-sensing area 111 of the touch-sensing panel 110. Each grid illustrated in FIG. 13 represents a sensing unit of the touch-sensing panel 110. The grids with no numbers in FIG. 13 represent the sensing units where no touch event is detected, and the numbers in the grids in FIG. 13 represent the sensing results (energy information) of the sensing units where a touch event is detected. Referring to FIG. 2 and FIG. 13, it may be seen from FIG. 13 that the touch-sensing area 111 has 4 touch area. The scenario illustrated in FIG. 13 is that the user holds the fingerprint identification device 100 by the left palm, wherein the user touches the right edge 111R of the touch-sensing area 111 by the forefinger, the middle finger and the ring finger of the left hand and touches the fingerprint sensing area 121 by the left thumb. When the touch area of the object 10 extends from the fingerprint sensing area 121 to the left edge 111L of the touch-sensing area 111, the processing circuit 130 may determine the finger attribute of the object 10 as the left thumb (step S1020). The processing circuit 130 may select the registered template related to the left thumb from the registered templates according to the finger attribute of the object 10 (step S1030), so as to perform the fingerprint matching on the fingerprint template of the object 10 (step S1050).

Figure 14:
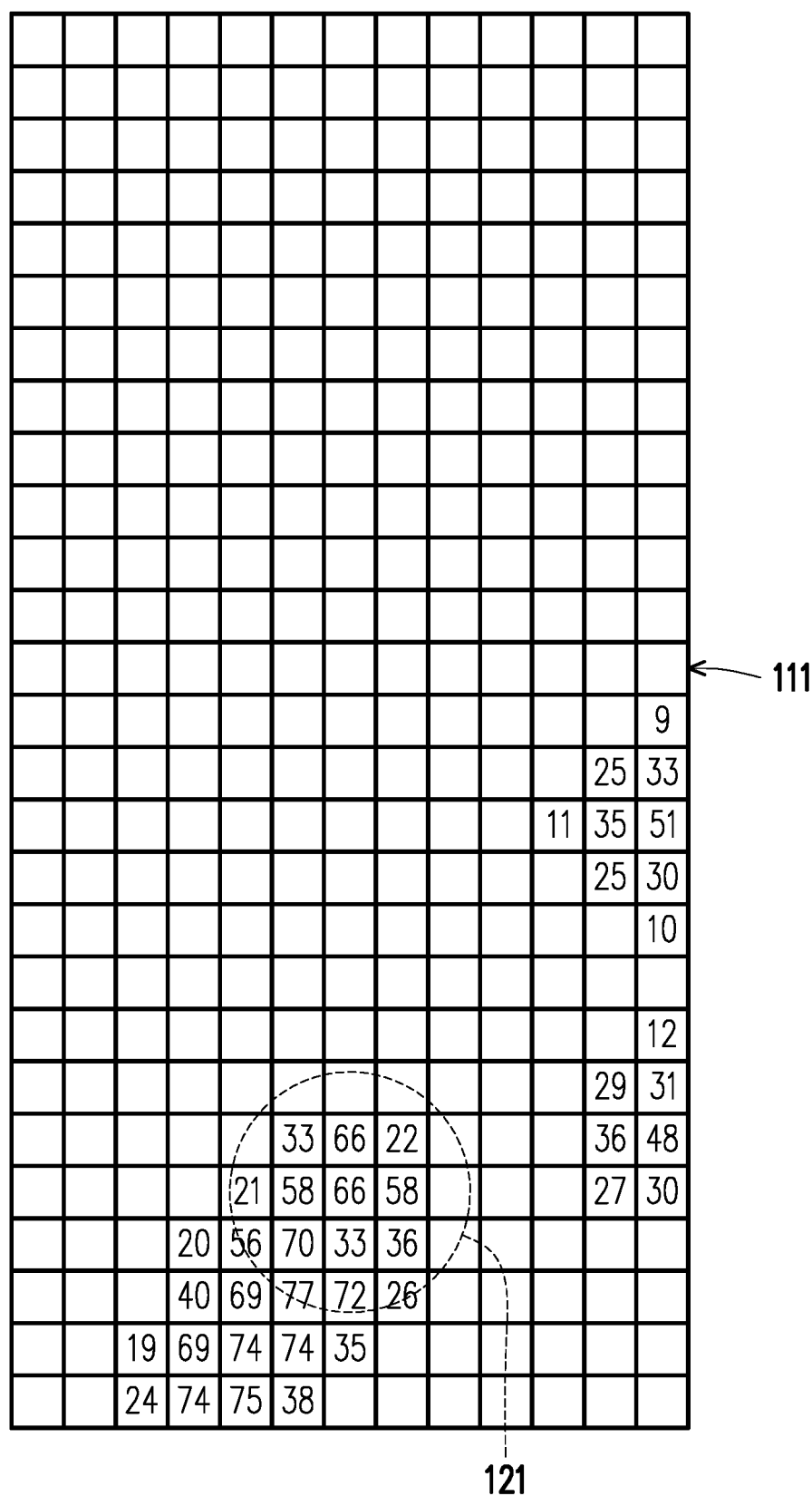
FIG. 14 is a schematic diagram illustrating another example of the touch-sensing area of the touch-sensing panel.

FIG. 14 is a schematic diagram illustrating another example of the touch-sensing area 111 of the touch-sensing panel 110. Each grid illustrated in FIG. 14 represents a sensing unit of the touch-sensing panel 110. The grids with no numbers in FIG. 14 represent the sensing units where no touch event is detected, and the numbers in the grids in FIG. 14 represent the sensing results (energy information) of the sensing units where a touch event is detected. According to FIG. 14, the touch-sensing area 111 has 3 touch areas. Referring to FIG. 2 and FIG. 14, the scenario illustrated in FIG. 14 is that the user holds fingerprint identification device 100 by the left hand, wherein the user touches the right edge 111R of the touch-sensing area 111 by the forefinger and the middle finger of the left hand and touches the fingerprint sensing area 121 by the left thumb. When the processing circuit 130 detects that the right edge 111R of the touch-sensing area 111 has a plurality of touch areas and the left edge 111L of the touch-sensing area 111 has no touch area via the touch-sensing panel 110, and when the long-axis direction of the touch area of the object 10 extends from the fingerprint sensing area 121 toward the third quadrant III of the fingerprint sensing area 121, the processing circuit 130 may determine the finger attribute of the object 10 as the left thumb (step S1020). The processing circuit 130 may select the registered template related to the left thumb from the registered templates according to the finger attribute of the object 10 (step S1030), so as to perform the fingerprint matching on the fingerprint template of the object 10 (step S1050).

Figure 15:
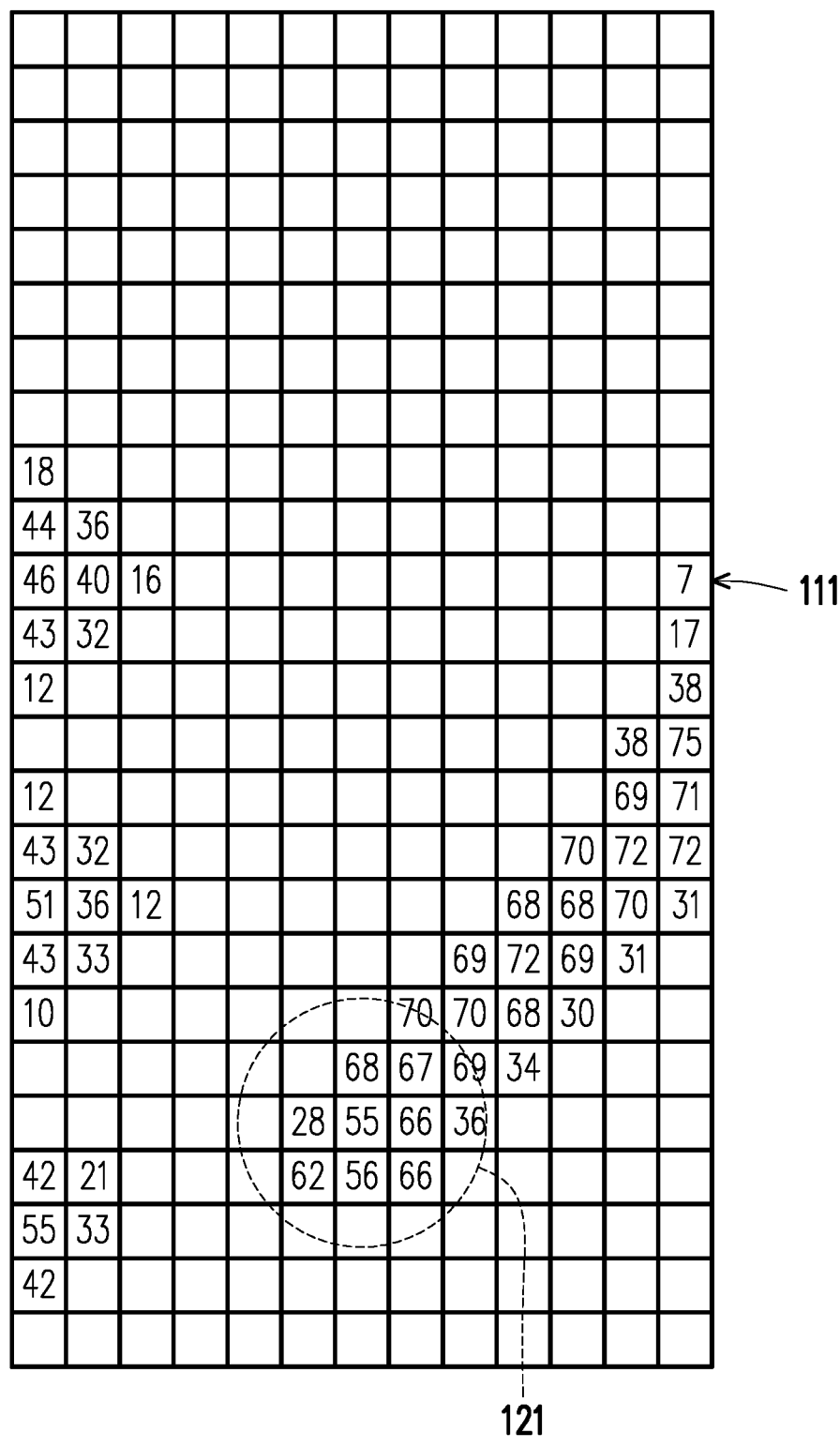
FIG. 15 is a schematic diagram illustrating yet another example of the touch-sensing area of the touch-sensing panel.

FIG. 15 is a schematic diagram illustrating yet another example of the touch-sensing area 111 of the touch-sensing panel 110. Each grid illustrated in FIG. 15 represents a sensing unit of the touch-sensing panel 110. The grids with no numbers in FIG. 15 represent the sensing units where no touch event is detected, and the numbers in the grids in FIG. 15 represent the sensing results (energy information) of the sensing units where a touch event is detected. According to FIG. 15, the touch-sensing area 111 has 4 touch areas. Referring to FIG. 2 and FIG. 15, the scenario illustrated in FIG. 15 is that the user holds the fingerprint identification device 100 by the right palm, wherein the user touches the fingerprint sensing area 121 by the right thumb and touches the left edge 111L of the touch-sensing area 111 by the forefinger, the middle finger and the ring finger of the right hand. When the touch area of the object 10 extends from the fingerprint sensing area 121 to the right edge 111R of the touch-sensing area 111, the processing circuit 130 may determine the finger attribute of the object 10 as the right thumb (step S1020). The processing circuit 130 may select the registered template related to the "right thumb" from the registered templates according to the finger attribute of the object 10 (step S1030), so as to perform the fingerprint matching on the fingerprint template of the object 10 (step S1050).

Figure 16:
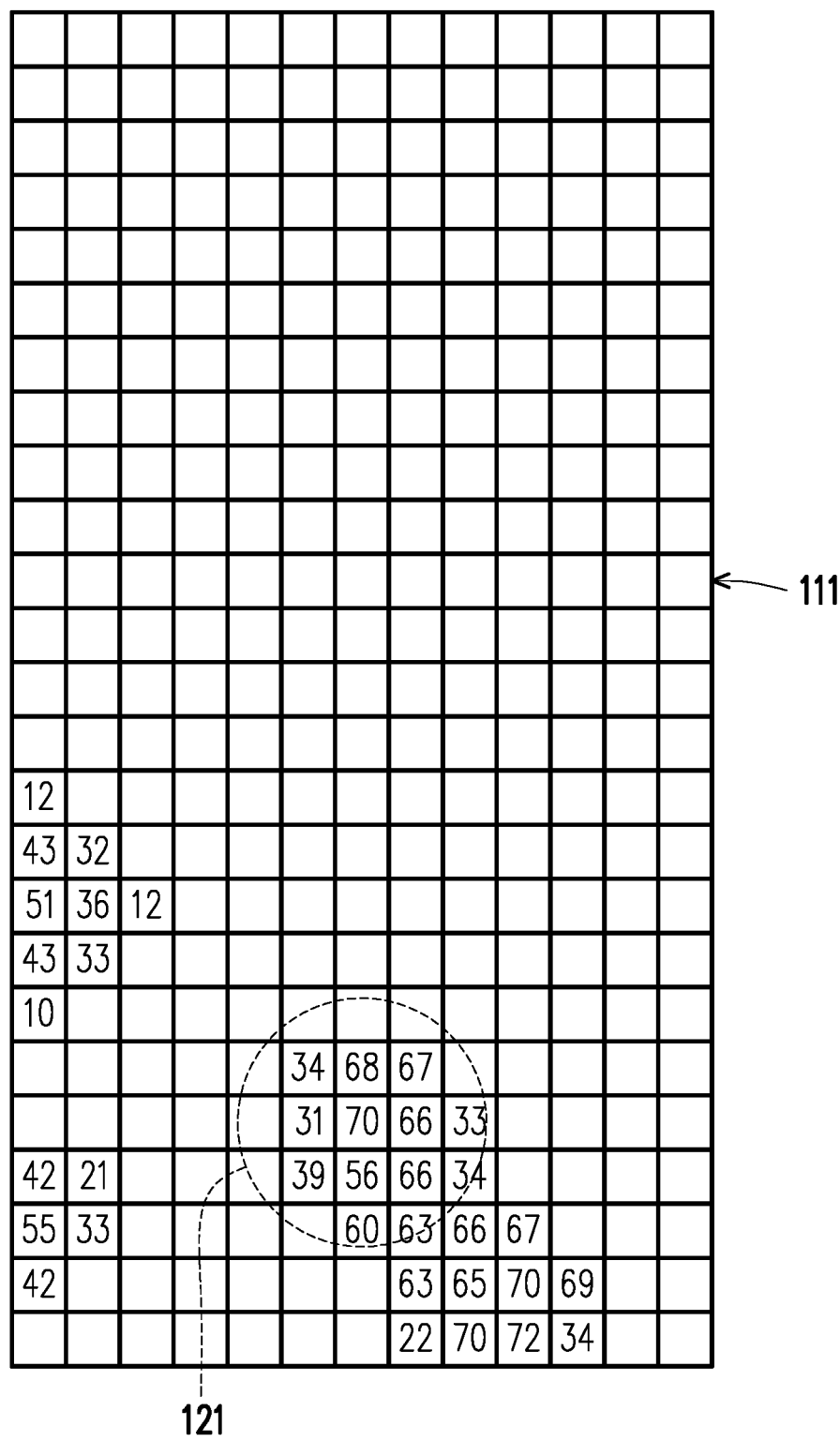
FIG. 16 is a schematic diagram illustrating another example of the touch-sensing area of the touch-sensing panel.

FIG. 16 is a schematic diagram illustrating another example of the touch-sensing area 111 of the touch-sensing panel 110. Each grid illustrated in FIG. 16 represents a sensing unit of the touch-sensing panel 110. The grids with no numbers in FIG. 16 represent the sensing units where no touch event is detected, and the numbers in the grids in FIG. 16 represent the sensing results (energy information) of the sensing units where a touch event is detected. According to FIG. 16, the touch-sensing area 111 has 3 touch areas. Referring to FIG. 2 and FIG. 16. The scenario illustrated in FIG. 16 is that the user holds the fingerprint identification device 100 by the right hand, wherein the user touches the left edge 111L of the touch-sensing area 111 by the forefinger and the middle finger of the right hand and touches the fingerprint sensing area 121 by the right thumb. When the processing circuit 130 detects that the left edge 111L of the touch-sensing area 111 has a plurality of touch areas and the right edge 111R of the touch-sensing area 111 has no touch area via the touch-sensing panel 110, and when the long-axis direction of the touch area of the object 10 extends from the fingerprint sensing area 121 toward the fourth quadrant IV of the fingerprint sensing area 121, the processing circuit 130 may determine the finger attribute of the object 10 as the right thumb (step S1020). The processing circuit 130 may select the registered template related to the "right thumb" from the registered templates according to the finger attribute of the object 10 (step S1030), so as to perform the fingerprint matching on the fingerprint template of the object 10 (step S1050).

According to the embodiments described above, the processing circuit 130 may effectively perform the fingerprint matching, so as to determine whether the fingerprint template of the object 10 is valid. After the fingerprint template of the object 10 is determined to be valid, the processing circuit 130 may perform a corresponding operation (which is a default fingerprint application, for example, unlocking). Based on a design requirement, while the fingerprint template of the object 10 is determined to be valid, the processing circuit 130 may also select one of a plurality of fingerprint applications according to a touch sensing result of the touch-sensing area 111. For example, when the fingerprint matching performed on the fingerprint template of the object 10 indicates to be matched (i.e., the fingerprint template is determined to be valid), the processing circuit 130 may perform the corresponding operation according to the touch areas at the right edge 111R of the touch-sensing area 111 and the touch areas at the left edge 111L of the touch-sensing area 111, so as to perform the selected fingerprint application.

Figure 17:
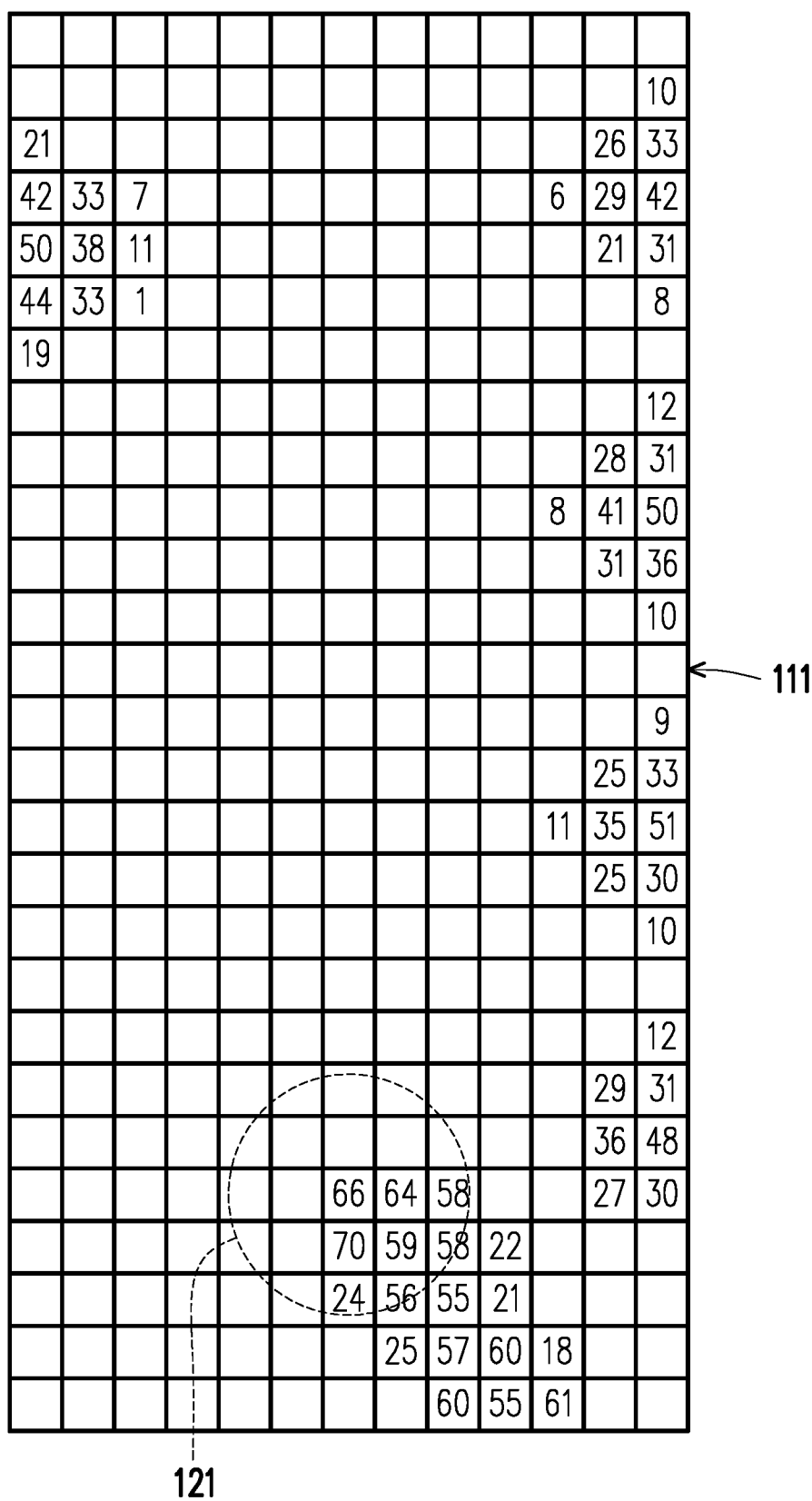
FIG. 17 is a schematic diagram illustrating another example of the touch-sensing area of the touch-sensing panel.

FIG. 17 is a schematic diagram illustrating another example of the touch-sensing area 111 of the touch-sensing panel 110. Each grid illustrated in FIG. 17 represents a sensing unit of the touch-sensing panel 110. The grids with no numbers in FIG. 17 represent the sensing units where no touch event is detected, and the numbers in the grids in FIG. 17 represent the sensing results (energy information) of the sensing units where a touch event is detected. According to FIG. 17, the touch-sensing area 111 has 6 touch areas. Referring to FIG. 2 and FIG. 17, the scenario illustrated in FIG. 17 is that the user holds the fingerprint identification device 100 by the left palm, wherein the user touches the right edge 111R of the touch-sensing area 111 by the forefinger, the middle finger, the ring finger and the little finger of the left hand and touches the left edge 111L of the touch-sensing area 111 by the left thumb. In a condition that the processing circuit 130 detects that the right edge 111R of the touch-sensing area 111 has 4 touch areas and the left edge 111L of the touch-sensing area 111 has a touch area via the touch-sensing panel 110, and the fingerprint matching performed on the fingerprint template of the object 10 indicates to be matched (i.e., the fingerprint template is determined to be valid), the processing circuit 130 may perform a corresponding operation (for example, unlocking a screen).

Figure 18:
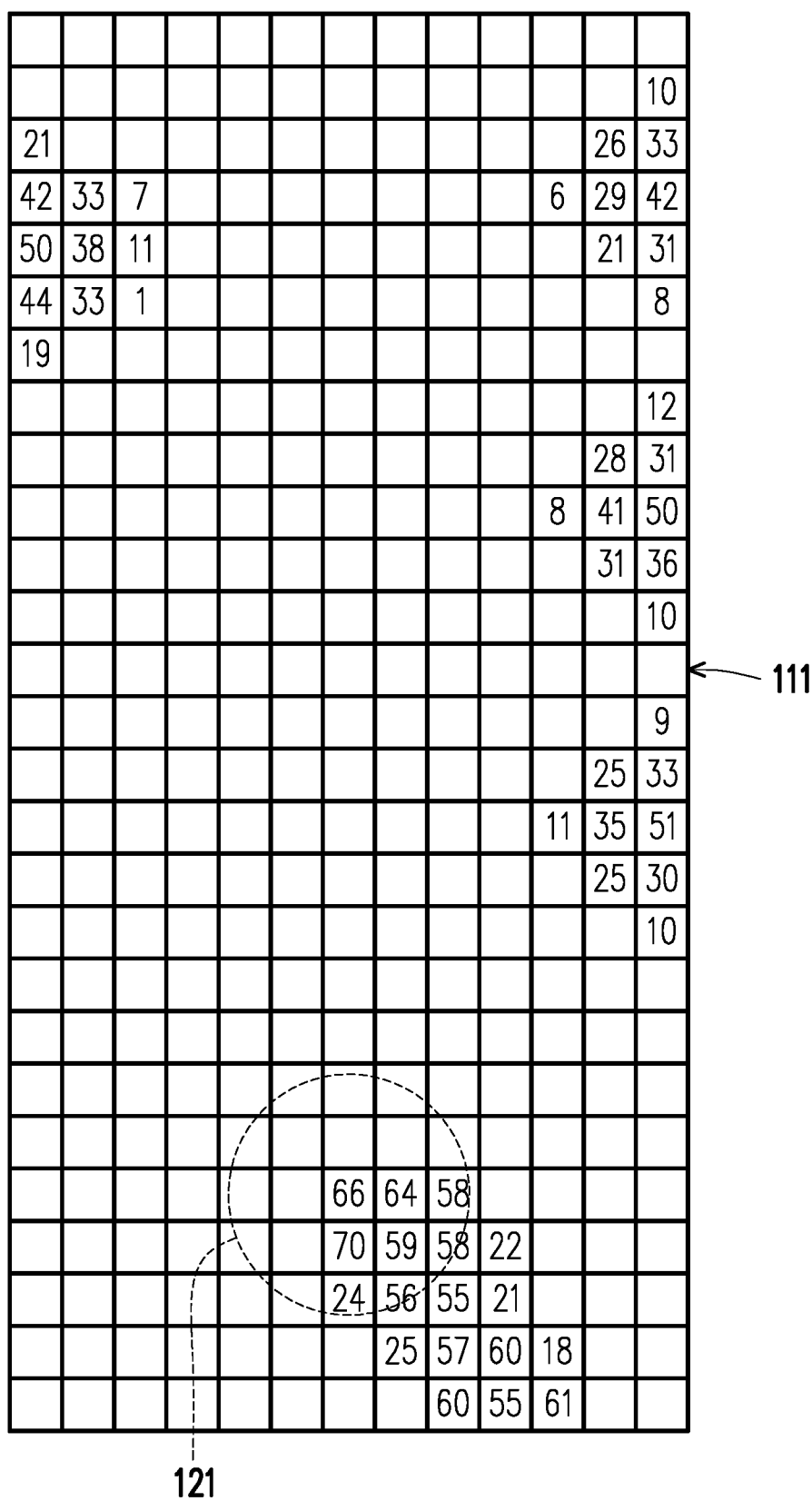
FIG. 18 is a schematic diagram illustrating yet another example of the touch-sensing area of the touch-sensing panel.

FIG. 18 is a schematic diagram illustrating yet another example of the touch-sensing area 111 of the touch-sensing panel 110. According to FIG. 18, the touch-sensing area 111 has 5 touch areas. Referring to FIG. 2 and FIG. 18. The scenario illustrated in FIG. 18 is that the user holds the fingerprint identification device 100 by the left palm, wherein the user touches the right edge 111R of the touch-sensing area 111 by the forefinger, the middle finger and the ring finger of the left hand and touches the left edge 111L of the touch-sensing area 111 by the left thumb. In a condition that the processing circuit 130 detects that the right edge 111R of the touch-sensing area 111 has 3 touch areas and the left edge 111L of the touch-sensing area 111 has a touch area via the touch-sensing panel 110, and the fingerprint matching performed on the fingerprint template of the object 10 indicates to be matched (i.e., the fingerprint template is determined to be valid), the processing circuit 130 may perform a corresponding operation (for example, dialing a specified/preset phone number).

Figure 19:
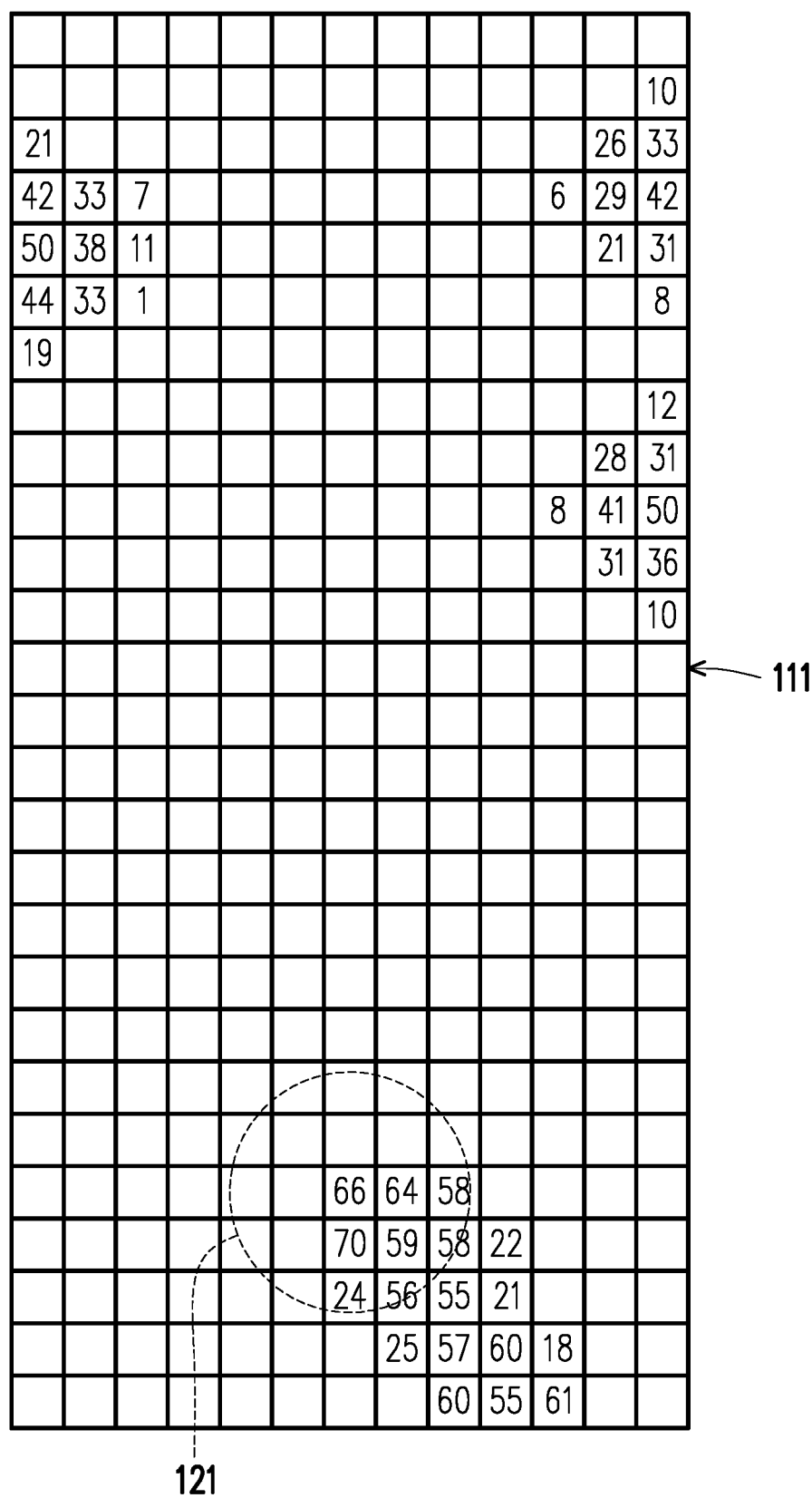
FIG. 19 is a schematic diagram illustrating yet another example of the touch-sensing area of the touch-sensing panel.

FIG. 19 is a schematic diagram illustrating yet another example of the touch-sensing area 111 of the touch-sensing panel 110. According to FIG. 19, the touch-sensing area 111 has 4 touch areas. Referring to FIG. 2 and FIG. 19, the scenario illustrated in FIG. 19 is that the user holds the fingerprint identification device 100 by the left palm, wherein the user touches the right edge 111R of the touch-sensing area 111 by the forefinger and the middle finger of the left hand and touches the left edge 111L of the touch-sensing area 111 by the left thumb. In a condition that the processing circuit 130 detects that the right edge 111R of the touch-sensing area 111 has 2 touch areas and the left edge 111L of the touch-sensing area 111 has a touch area via the touch-sensing panel 110, and the fingerprint matching performed on the fingerprint template of the object 10 indicates to be matched (i.e., the fingerprint template is determined to be valid), the processing circuit 130 may perform a corresponding operation (for example, starting up a specified/preset application/APP).

Figure 20:
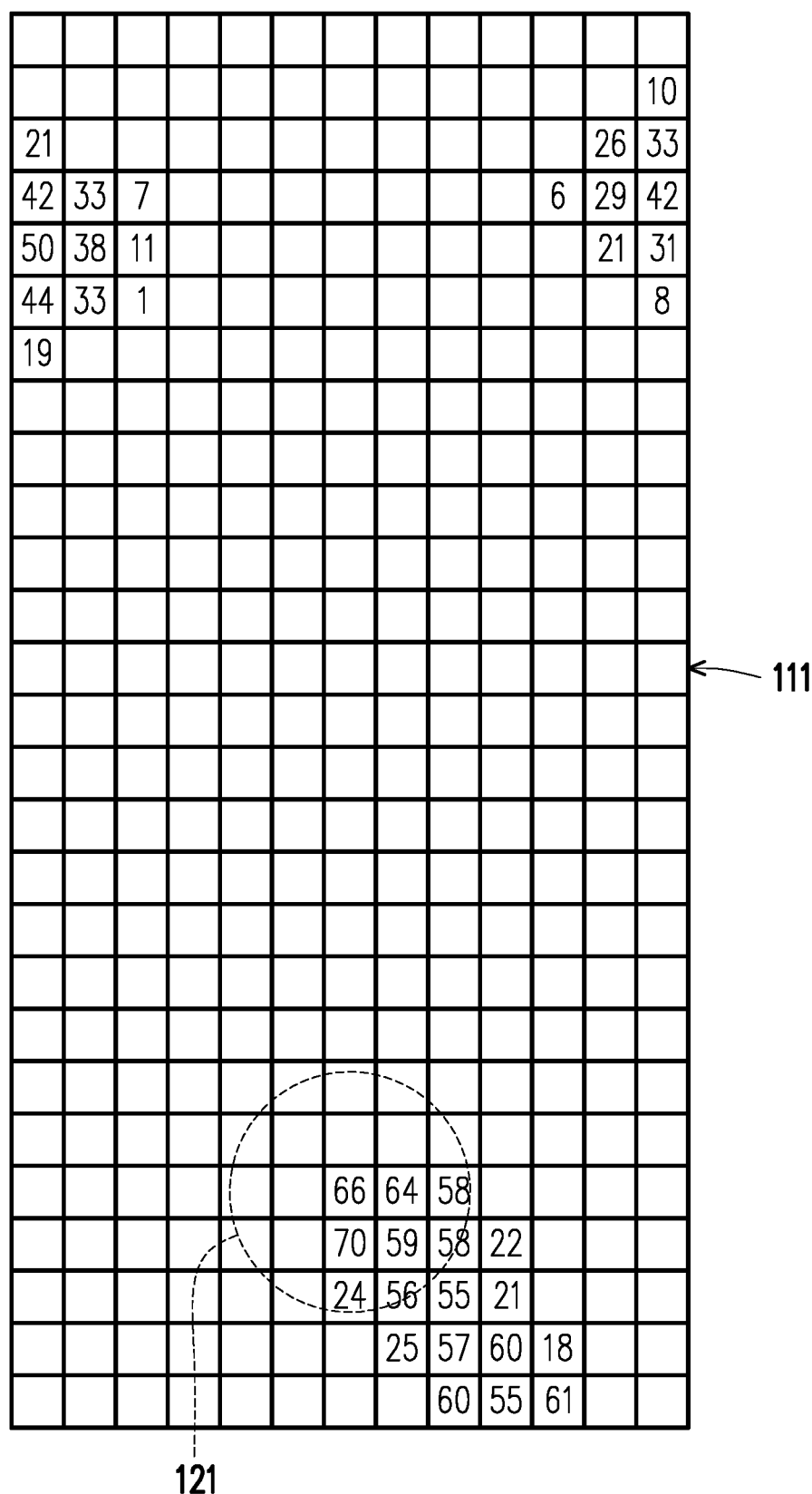
FIG. 20 is a schematic diagram illustrating yet another example of the touch-sensing area of the touch-sensing panel.

FIG. 20 is a schematic diagram illustrating yet another example of the touch-sensing area 111 of the touch-sensing panel 110. According to FIG. 20, the touch-sensing area 111 has 3 touch areas. Referring to FIG. 2 and FIG. 20, the scenario illustrated in FIG. 20 is that the user holds the fingerprint identification device 100 by the left palm, wherein the user touches the right edge 111R of the touch-sensing area 111 by the left forefinger and touches the left edge 111L of the touch-sensing area 111 by the left thumb. In a condition that the processing circuit 130 detects that the right edge 111R of the touch-sensing area 111 has a touch area and the left edge 111L of the touch-sensing area 111 has a touch area via the touch-sensing panel 110, and the fingerprint matching performed on the fingerprint template of the object 10 indicates to be matched (i.e., the fingerprint template is determined to be valid), the processing circuit 130 may perform a corresponding operation (for example, turning off the volume when the screen is off).

Figure 21:
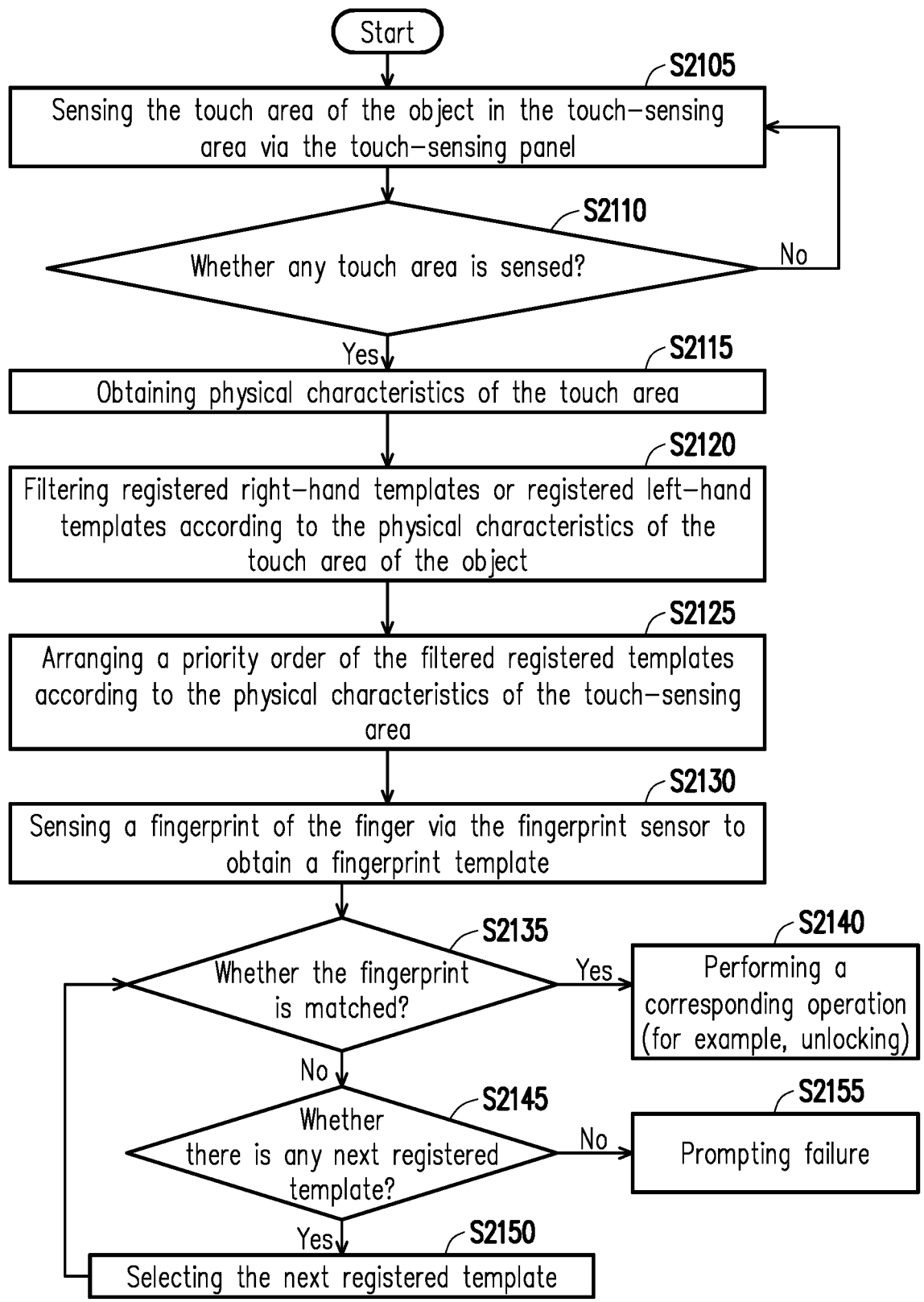
FIG. 21 is a flowchart illustrating a fingerprint identification method according to yet another embodiment of the invention.

FIG. 21 is a flowchart illustrating a fingerprint identification method according to yet another embodiment of the invention. FIG. 21 illustrates a fingerprint matching process. Referring to FIG. 3 and FIG. 21, when the object 10 contacts the touch-sensing area 111 of the touch-sensing panel 110, the processing circuit 130 may sense the touch area of the object 10 in the touch-sensing area 111 via the touch-sensing panel 110 (step S2105). When the object 10 (for example, a finger) is not sensed (i.e., the result of step S2110 is "No"), the processing circuit 130 again performs step S2105. When the touch area of the object 10 is sensed (i.e., the result of step S2110 is "Yes"), the processing circuit 130 performs step S2115.

In step S2115, the processing circuit 130 may obtain physical characteristics of the touch area of the object 10 in the touch-sensing area 111 via the touch-sensing panel 110. The physical characteristics may be inferred with reference to the descriptions related to the embodiments above and thus, will not be repeated. In step S2120, the processing circuit 130 may filter registered right-hand templates or registered left-hand templates from the registered templates according to the physical characteristics of the touch area of the object 10. In step S2125, the processing circuit 130 may arrange a priority order of the filtered registered templates according to the physical characteristics of the touch-sensing area 111. In step S2130, the processing circuit 130 may sense a fingerprint of the object 10 via the fingerprint sensor 120 to obtain a fingerprint template. A detailed implementation example of step S2130 illustrated in FIG. 21 may be inferred to the description related to step S1040 illustrated in FIG. 10 and thus, will not be repeated.

In step S2135, the processing circuit 130 may perform the fingerprint matching by using the priority order determined in step S2125. When a currently selected registered template is capable of matching the fingerprint template of the object 10 (i.e., the result of step S2135 is "Yes"), the processing circuit 130 performs step S2140. In step S2140, the processing circuit 130 may perform a corresponding operation (i.e., a fingerprint application, for example, unlocking a screen).

When the currently selected registered template does not match the fingerprint template of the object 10 (i.e., the result of step S2135 is "No"), the processing circuit 130 performs step S2145. In step S2145, the processing circuit 130 may determine whether there is any next registered template on which the fingerprint matching is not performed. When there is a next registered template on which the fingerprint matching is not performed (i.e., the result of step S2145 is "Yes"), the processing circuit 130 performs step S2150. In step S2150, the processing circuit 130 may select the next registered template on which the fingerprint matching is not performed according to the priority order determined in step S2125. Then, the processing circuit 130 again performs step S2135. When the fingerprint matching has been performed on all of the registered templates (i.e., the result of step S2145 is "No"), the processing circuit 130 performs step S2155. In step S2155, the processing circuit 130 may send a signal to prompt that "fingerprint matching failed".

For example, it is assumed that the registered templates of the 10 fingers of a user are stored in a database (not shown). Referring to the descriptions related to FIG. 5 and FIG. 6, when the right forefinger (i.e., the object 10) contacts the fingerprint sensing area 121, because the long-axis direction of the touch area of the object 10 extends from the fingerprint sensing area 121 toward the fourth quadrant IV of the fingerprint sensing area 121, the processing circuit 130, in step S1020, may determine the finger attribute of the object 10 as the "right-hand finger". Thus, the processing circuit 130, in step S2120, may select (filter) 5 registered templates related to the "right-hand finger" from the 10 registered templates according to the finger attribute of the object 10. The processing circuit 130, in step S2125, may determine the finger attribute of the object 10 according to an area of the touch area of the object 10. When the area of the touch area of the object 10 is greater than a threshold, the processing circuit 130 may determine the finger attribute of the object 10 as a thumb. Thus, among the 5 registered templates related to the "right-hand finger" selected (filtered) in step S2120, the processing circuit 130 may set the priority order of the registered template corresponding to the finger attribute which is "thumb" to have the first priority, so as to perform the fingerprint matching on the fingerprint template of the object 10 in step S2135.

Referring to FIG. 1 and FIG. 3, in the condition that the touch-sensing panel 110 is implemented by the touch display panel, the backlight source of the touch display panel may be served as the light source to provide the light to the object 10. Generally, the higher the brightness of the light source is, the more preferable the fingerprint image detected by the fingerprint sensor 120 is. Thus, when performing fingerprint registration and fingerprint authentication, the processing circuit 130 may set the backlight source of the touch display panel (i.e., the touch-sensing panel 110) to a high brightness mode (HBM), such that the fingerprint sensor 120 may sense preferable image quality. However, if the backlight source is operated in the HBM for a long time, the service life of the touch display panel (i.e., the touch-sensing panel 110) is reduced.

In the present embodiment, the processing circuit 130 may automatically determine the HBM of the touch-sensing panel 110 for the fingerprint sensor 120 to detect a preferable fingerprint image. To be detailed, when the processing circuit 130 detects that a touch event occurs in a touch area (or multiple touch areas) at a first edge (for example, the right edge 111R) of the touch-sensing area 111 and a touch event occurs in another touch area (or multiple touch areas) at a second edge (for example, the left edge 111L) of the touch-sensing area 111 via the touch-sensing panel 110, the processing circuit 130 enables the HBM of the touch-sensing panel 110 for the fingerprint sensor 120 to sense fingerprints of the object 10. After the sensing of the fingerprint sensor 120 is completed, the processing circuit 130 may immediately ends the HBM and induce the touch-sensing panel 110 to enter a normal brightness mode.

For example, when the processing circuit 130 detects the multiple touch areas as illustrated in FIG. 11, FIG. 12, FIG. 13, FIG. 14, FIG. 15, FIG. 16, FIG. 17, FIG. 18, FIG. 19 and/or FIG. 20 via the touch-sensing panel 110, the processing circuit 130 may immediately enable the HBM of the touch-sensing panel 110 for the fingerprint sensor 120 to sense the fingerprints of the object 10. Thus, the processing circuit 130 may prevent the HBM from being erroneously enabled due to the user inadvertently touching the touch-sensing panel 110.

Based on a design requirement, in some embodiments, the fingerprint identification device 100 may further includes a motion sensor (not shown). Based on a design requirement, the motion sensor may include a G sensor, a gyro sensor, an electronic compass and/or other motion sensors. The motion sensor is coupled to the processing circuit 130. The processing circuit 130 may detect a direction (for example, a normal direction) of the touch-sensing panel 110 via the motion sensor (not shown). When the processing circuit 130 detects that a touch event occurs in a touch area (or multiple touch areas) at the first edge (for example, the right edge 111R) of the touch-sensing area 111 and a touch event occurs in another touch area (or multiple touch areas) at the second edge (for example, the left edge 111L) of the touch-sensing area 111 via the touch-sensing panel 110, and when the touch-sensing panel 110 faces upwards, the processing circuit 130 may enable the HBM of the touch-sensing panel 110 for the fingerprint sensor 120 to sense the fingerprints of the object 10.

Based on different design requirements, the implementation manner of the block of the processing circuit 130 may be a hardware form, a firmware form, a software (i.e., program) form or a combined form of many of the aforementioned forms.

In terms of the hardware form, the block of the processing circuit 130 may be implemented in a logic circuit on an integrated circuit. Related functions of the processing circuit 130 may be implemented in the hardware form by utilizing hardware description languages (e.g., Verilog HDL or VHDL) or other suitable programming languages. For example, the related functions of the processing circuit 130 may be implemented in one or more controllers, microcontrollers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the processing circuit 130 may be implemented as programming codes. For example, the processing circuit 130 may be implemented by using general programming languages (e.g., C or C++) or other suitable programming languages. The programming codes may be recorded/stored in recording media. The aforementioned recording media include a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a non-transitory computer readable medium, such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

In light of the foregoing, in the embodiments of the invention, the fingerprint sensor can sense the fingerprint of the object to obtain the fingerprint template. During a period of sensing the fingerprint of the object, the touch-sensing panel can sense the touch area of the object in the touch-sensing area. The processing circuit 130 can determine the finger attribute of the object according to the physical characteristic of the touch area. According to the finger attribute, the processing circuit can select one (or more) registered templates related to the finger attribute from the registered templates, so as to perform the fingerprint matching on the fingerprint template. The processing circuit can select the registered fingerprint, without according to the order of the registered fingerprints in the database. Thus, the fingerprint identification device and method provided by the embodiments of the invention can enhance the efficiency of the fingerprint matching.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A fingerprint identification device, comprising:
a touch-sensing panel;
a fingerprint sensor, disposed under the touch-sensing panel, wherein a fingerprint sensing area of the fingerprint sensor is located in a touch-sensing area of the touch-sensing panel; and
a processing circuit, coupled to the touch-sensing panel and the fingerprint sensor, wherein
when an object contacts the touch-sensing area of the touch-sensing panel, the processing circuit senses a first touch area of the object in the touch-sensing area via the touch-sensing panel;
the processing circuit senses a fingerprint of the object via the fingerprint sensor to obtain a first fingerprint template;
the processing circuit determines a finger attribute of the object according to a first physical characteristic of the first touch area, wherein the finger attribute comprises a left-hand finger, a left thumb, a right-hand finger, or a right thumb; and
the processing circuit selects at least one registered template related of the finger attribute from a plurality of registered templates according to the first physical characteristic representing the finger attribute of the object, so as to perform fingerprint matching on the first fingerprint template,
wherein in a registration mode, the processing circuit senses a fingerprint of a finger via the fingerprint sensor to obtain a second fingerprint template, the processing circuit detects a second physical characteristic of a second touch area of the finger in the touch-sensing area via the touch-sensing panel, the second physical characteristic comprises a long-axis direction of the second touch area, and the processing circuit serves the second fingerprint template and the second physical characteristic representing a finger attribute of the finger as a newly added registered template in the plurality of registered templates.

2. The fingerprint identification device according to claim 1, wherein
the first physical characteristic comprises a long-axis direction of the first touch area; and
the processing circuit determines the finger attribute of the object according to the long-axis direction of the first touch area.

3. The fingerprint identification device according to claim 2, wherein
when the long-axis direction of the first touch area extends from the fingerprint sensing area toward the fourth quadrant of the fingerprint sensing area, the processing circuit determines the finger attribute of the object as the right-hand finger, and the processing circuit selects the registered template related to the right-hand finger from the plurality of registered templates according to the finger attribute, so as to perform the fingerprint matching on the first fingerprint template; and when the long-axis direction of the first touch area extends from the fingerprint sensing area toward the third quadrant of the fingerprint sensing area, the processing circuit determines that the finger attribute of the object as the left-hand finger, and the processing circuit selects the registered template related to the left-hand finger from the plurality of registered templates according to the finger attribute, so as to perform the fingerprint matching on the first fingerprint template.

4. The fingerprint identification device according to claim 2, wherein when the first touch area extends from the fingerprint sensing area to a first edge of the touch-sensing area, the processing circuit determines the finger attribute of the object as the right thumb, and the processing circuit selects the registered template related to the right thumb from the plurality of registered templates according to the finger attribute, so as to perform the fingerprint matching on the first fingerprint template; and when the first touch area extends from the fingerprint sensing area to a second edge of the touch-sensing area, the processing circuit determines the finger attribute of the object is the left thumb, and the processing circuit selects the registered template related to the left thumb from the plurality of registered templates according to the finger attribute, so as to perform the fingerprint matching on the first fingerprint template, wherein the first edge is located to the right of the fingerprint sensing area, and the second edge is located to the left of the fingerprint sensing area.

5. The fingerprint identification device according to claim 2, wherein when the processing circuit detects that a first edge of the touch-sensing area has at least one second touch area which is different from the first touch area and a second edge of the touch-sensing area has at least one third touch area which is different from the first touch area and the second touch area via the touch-sensing panel, and when the long-axis direction of the first touch area extends from the fingerprint sensing area toward the fourth quadrant of the fingerprint sensing area, the processing circuit determines the finger attribute of the object as the right-hand finger, and the processing circuit selects the registered template related to the right-hand finger from the plurality of registered templates according to the finger attribute, so as to perform the fingerprint matching on the first fingerprint template; and when the processing circuit detects that the first edge of the touch-sensing area has the at least one second touch area and the second edge of the touch-sensing area has the at least one third touch area via the touch-sensing panel, and when the long-axis direction of the first touch area extends from the fingerprint sensing area toward the third quadrant of the fingerprint sensing area, the processing circuit determines the finger attribute of the object as the left-hand finger, and the processing circuit selects the registered template related to the left-hand finger from the plurality of registered templates according to the finger attribute, so as to perform the fingerprint matching on the first fingerprint template, wherein the first edge is located to the right of the fingerprint sensing area, and the second edge is located to the left of the fingerprint sensing area.

6. The fingerprint identification device according to claim 5, wherein when the fingerprint matching performed on the first fingerprint template indicates to be matched, the processing circuit performs a corresponding operation according to the at least one second touch area and the at least one third touch area.

7. The fingerprint identification device according to claim 1, wherein the first physical characteristic comprises an area of the first touch area; and the processing circuit determines the finger attribute of the object according to the area of the first touch area.

8. The fingerprint identification device according to claim 7, wherein when the area of the first touch area is greater than a threshold, the processing circuit determines the finger attribute of the object as a thumb, and the processing circuit selects the registered template related to the thumb from the plurality of registered templates according to the finger attribute, so as to perform the fingerprint matching on the first fingerprint template.

9. The fingerprint identification device according to claim 1, wherein the first physical characteristic comprises a pressure of the first touch area; and the processing circuit determines the finger attribute of the object according to the pressure of the first touch area.

10. The fingerprint identification device according to claim 9, wherein when the pressure of the first touch area is greater than a threshold, the processing circuit determines the finger attribute of the object as a thumb, and the processing circuit selects the registered template related to the thumb from the plurality of registered templates according to the finger attribute, so as to perform the fingerprint matching on the first fingerprint template.

11. The fingerprint identification device according to claim 1, wherein the processing circuit enables a high brightness mode of the touch-sensing panel for the fingerprint sensor to sense the fingerprint of the object when the processing circuit detects that a touch event occurs in at least one second touch area at a first edge of the touch-sensing area and a touch event occurs in at least one third touch area at a second edge of the touch-sensing area via the touch-sensing panel, wherein the second touch area and the third touch area are different from the first touch area.

12. The fingerprint identification device according to claim 1, further comprising:

a motion sensor, coupled to the processing circuit, wherein the processing circuit detects a direction of the touch-sensing panel via the motion sensor, when the processing circuit detects that a touch event occurs in at least one second touch area at a first edge of the touch-sensing area and a touch event occurs in at least one third touch area at a second edge of the touch-sensing area via the touch-sensing panel, and when the touch-sensing panel faces upwards, the processing circuit enables a high brightness mode of the touch-sensing panel for the fingerprint sensor to sense the fingerprint of the object.

13. A fingerprint identification method, comprising:
when an object contacts a touch-sensing area of a touch-sensing panel, sensing a first touch area of the object in the touch-sensing area via the touch-sensing panel, wherein a fingerprint sensor is disposed under the touch-sensing panel, and a fingerprint sensing area of the fingerprint sensor is located in the touch-sensing area of the touch-sensing panel;
sensing a fingerprint of the object via the fingerprint sensor to obtain a first fingerprint template;
determining a finger attribute of the object according to a first physical characteristic of the first touch area, wherein the finger attribute comprises a left-hand finger, a left thumb, a right-hand finger, or a right thumb;
selecting at least one registered template related of the finger attribute from a plurality of registered templates according to the first physical characteristic representing the finger attribute of the object, so as to perform fingerprint matching on the first fingerprint template; and
in a registration mode, sensing a fingerprint of a finger by the fingerprint sensor to obtain a second fingerprint template, detecting a second physical characteristic of a second touch area of the finger in the touch-sensing area via the touch-sensing panel, and serving the second fingerprint template and the second physical characteristic representing a finger attribute of the finger as a newly added registered template in the plurality of registered templates, wherein the second physical characteristic comprises a long-axis direction of the second touch area.

14. The fingerprint identification method according to claim 13, wherein the first physical characteristic comprises a long-axis direction of the first touch area, and the step of determining the finger attribute of the object comprises:
determining the finger attribute of the object according to the long-axis direction of the first touch area.

15. The fingerprint identification method according to claim 14, wherein the step of determining the finger attribute of the object further comprises:
when the long-axis direction of the first touch area extends from the fingerprint sensing area toward the fourth quadrant of the fingerprint sensing area, determining the finger attribute of the object as the right-hand finger, wherein the step of selecting the at least one registered template related of the finger attribute comprises selecting the registered template related to the right-hand finger from the plurality of registered templates according to the finger attribute, so as to perform the fingerprint matching on the first fingerprint template; and
when the long-axis direction of the first touch area extends from the fingerprint sensing area toward the third quadrant of the fingerprint sensing area, determining the finger attribute of the object as the left-hand finger, wherein the step of selecting the at least one registered template related of the finger attribute comprises selecting the registered template related to the left-hand finger from the plurality of registered templates according to the finger attribute, so as to perform the fingerprint matching on the first fingerprint template.

16. The fingerprint identification method according to claim 14, wherein the step of determining the finger attribute of the object further comprises:
when the first touch area extends from the fingerprint sensing area to a first edge of the touch-sensing area, determining the finger attribute of the object as the right thumb, wherein the step of selecting the at least one registered template related of the finger attribute comprises selecting the registered template related to the right thumb from the plurality of registered templates according to the finger attribute, so as to perform the fingerprint matching on the first fingerprint template; and
when the first touch area extends from the fingerprint sensing area to a second edge of the touch-sensing area, determining the finger attribute of the object as the left thumb, wherein the step of selecting the at least one registered template related of the finger attribute comprises selecting the registered template related to the left thumb from the plurality of registered templates according to the finger attribute, so as to perform the fingerprint matching on the first fingerprint template,
wherein the first edge is located to the right of the fingerprint sensing area, and the second edge is located to the left of the fingerprint sensing area.

17. The fingerprint identification method according to claim 14, wherein the step of determining the finger attribute of the object further comprises:
when the touch-sensing panel detects that a first edge of the touch-sensing area has at least one second touch area which is different from the first touch area and a second edge of the touch-sensing area has at least one third touch area which is different from the first touch area and the second touch area, and when the long-axis direction of the first touch area extends from the fingerprint sensing area toward the fourth quadrant of the fingerprint sensing area, determining the finger attribute of the object as the right-hand finger, wherein the step of selecting the at least one registered template related of the finger attribute comprises selecting the registered template related to the right-hand finger from the plurality of registered templates according to the finger attribute, so as to perform the fingerprint matching on the first fingerprint template; and
when the touch-sensing panel detects that the first edge of the touch-sensing area has the at least one second touch area and the second edge of the touch-sensing area has the at least one third touch area, and when the long-axis direction of the first touch area extends from the fingerprint sensing area toward the third quadrant of the fingerprint sensing area, determining the finger attribute of the object as the left-hand finger, wherein the step of selecting the at least one registered template related of the finger attribute comprises selecting the registered template related to the left-hand finger from the plurality of registered templates according to the finger attribute, so as to perform the fingerprint matching on the first fingerprint template,
wherein the first edge is located to the right of the fingerprint sensing area, and the second edge is located to the left of the fingerprint sensing area.

18. The fingerprint identification method according to claim 17, further comprising:
when the fingerprint matching performed on the first fingerprint template indicates to be matched, performing a corresponding operation according to the at least one second touch area and the at least one third touch area.

19. The fingerprint identification method according to claim 13, wherein the first physical characteristic comprises an area of the first touch area, and the step of determining the finger attribute of the object comprises:

determining the finger attribute of the object according to the area of the first touch area.

20. The fingerprint identification method according to claim 19, wherein the step of determining the finger attribute of the object further comprises:
when the area of the first touch area is greater than a threshold, determining the finger attribute of the object as a thumb, wherein the step of selecting the at least one registered template related of the finger attribute comprises selecting the registered template related to the thumb from the plurality of registered templates according to the finger attribute, so as to perform the fingerprint matching on the first fingerprint template.

21. The fingerprint identification method according to claim 13, wherein the first physical characteristic comprises a pressure of the first touch area, and the step of determining the finger attribute of the object comprises:
determining the finger attribute of the object according to the pressure of the first touch area.

22. The fingerprint identification method according to claim 21, wherein the step of determining the finger attribute of the object further comprises:
when the pressure of the first touch area is greater than a threshold, determining the finger attribute of the object as a thumb, wherein the step of selecting the at least one registered template related of the finger attribute comprises selecting the registered template related to the thumb from the plurality of registered templates according to the finger attribute, so as to perform the fingerprint matching on the first fingerprint template.

23. The fingerprint identification method according to claim 13, further comprising:
enabling a high brightness mode of the touch-sensing panel for the fingerprint sensor to sense the fingerprint of the object when the touch-sensing panel detects that a touch event occurs in at least one second touch area at a first edge of the touch-sensing area and a touch event occurs in at least one third touch area at a second edge of the touch-sensing area, wherein the second touch area and the third touch area are different from the first touch area.

24. The fingerprint identification method according to claim 13, further comprising:
detecting a direction of the touch-sensing panel by a motion sensor;
when the touch-sensing panel detects that a touch event occurs in at least one second touch area at a first edge of the touch-sensing area and a touch event occurs in at least one third touch area at a second edge of the touch-sensing area, and when the touch-sensing panel faces upwards, enabling a high brightness mode of the touch-sensing panel for the fingerprint sensor to sense the fingerprint of the object.

25. A fingerprint identification device, comprising:
a touch-sensing panel;
a fingerprint sensor, disposed under the touch-sensing panel, wherein a fingerprint sensing area of the fingerprint sensor is located in a touch-sensing area of the touch-sensing panel; and
a processing circuit, coupled to the touch-sensing panel and the fingerprint sensor, wherein
in a registration mode, the processing circuit senses a fingerprint of a finger via the fingerprint sensor to obtain a fingerprint template, the processing circuit detects a physical characteristic of a touch area of the finger in the touch-sensing area via the touch-sensing panel, the physical characteristic comprises a long-axis direction of the touch area, and the processing circuit serves the fingerprint template and the physical characteristic representing a finger attribute of the finger as a newly added registered template.

26. A fingerprint identification method, comprising:
disposing a fingerprint sensor under a touch-sensing panel, wherein a fingerprint sensing area of the fingerprint sensor is located in a touch-sensing area of the touch-sensing panel; and
in a registration mode, sensing a fingerprint of a finger via the fingerprint sensor to obtain a fingerprint template, detecting a physical characteristic of a touch area of the finger in the touch-sensing area via the touch-sensing panel, and serving the fingerprint template and the physical characteristic representing a finger attribute of the finger as a newly added registered template, wherein the physical characteristic comprises a long-axis direction of the touch area.

* * * * *